United States Patent
Tatsumoto et al.

(10) Patent No.: US 12,424,040 B2
(45) Date of Patent: Sep. 23, 2025

(54) ENHANCED LOCKER SECURITY APPARATUS AND METHOD

(71) Applicant: TOYOTA JIDOSHA KABUSHIKI KAISHA, Toyota (JP)

(72) Inventors: Yuki Tatsumoto, Nisshin (JP); Yukinari Kato, Okazaki (JP); Toshiki Kashiwakura, Ota-ku Tokyo-to (JP); Hiroyuki Suzuki, Miyoshi (JP); Hirohiko Taniguchi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 17/943,362

(22) Filed: Sep. 13, 2022

(65) Prior Publication Data
US 2023/0080797 A1 Mar. 16, 2023

(30) Foreign Application Priority Data
Sep. 15, 2021 (JP) .................... 2021-150080

(51) Int. Cl.
G07C 9/00 (2020.01)
G06Q 10/0836 (2023.01)

(52) U.S. Cl.
CPC ..... G07C 9/00912 (2013.01); G06Q 10/0836 (2013.01); G07C 9/00182 (2013.01); G07C 2009/0092 (2013.01)

(58) Field of Classification Search
CPC ........ G07C 9/00912; G07C 2009/0092; G07C 9/00182; G06Q 10/0836
See application file for complete search history.

(56) References Cited

U.S. PATENT DOCUMENTS

| | | | |
|---|---|---|---|
| 2010/0257904 A1* | 10/2010 | Rickrode | E05B 39/00 70/57.1 |
| 2012/0019360 A1* | 1/2012 | McGinn | G06Q 30/02 340/5.73 |
| 2015/0106291 A1* | 4/2015 | Robinson | G06Q 10/0836 705/339 |
| 2017/0138112 A1* | 5/2017 | Makke | B60R 25/30 |
| 2018/0372447 A1* | 12/2018 | Hyde | E05B 47/00 |
| 2019/0102962 A1* | 4/2019 | Miller | G07C 9/00309 |
| 2019/0164114 A1 | 5/2019 | Kadotani et al. | |
| 2020/0229596 A1* | 7/2020 | Finney | A47B 81/005 |
| 2020/0364657 A1* | 11/2020 | Estill | G06K 7/1413 |
| 2021/0097791 A1* | 4/2021 | Wilkins | G07C 9/00309 |
| 2021/0252715 A1 | 8/2021 | Javidan et al. | |

(Continued)

FOREIGN PATENT DOCUMENTS

JP 2019-096201 A 6/2019

*Primary Examiner* — Ryan W Sherwin
(74) *Attorney, Agent, or Firm* — Dinsmore & Shohl LLP

(57) ABSTRACT

The present disclosure enhances security of a service of storing baggage in a locker loaded in a vehicle. An information processing apparatus of the present disclosure includes a controller configured to, for baggage stored in a locker loaded in a vehicle, make a notification that confirms unlocking of the locker to a user terminal associated with the baggage, with a locked state of the locker being maintained, when a predetermined event related to unlocking of the locker is detected before a first date and time set in advance. The controller decides whether or not to take out the baggage from the locker based on an answer to the notification from the user terminal.

10 Claims, 14 Drawing Sheets

(56) References Cited

U.S. PATENT DOCUMENTS

2022/0079368 A1* 3/2022 Hall ..................... B62D 31/025
2022/0129829 A1* 4/2022 Pourteymour ..... G07C 9/00182
2022/0161758 A1* 5/2022 Moeller ................. G06F 3/167

* cited by examiner

Fig. 3
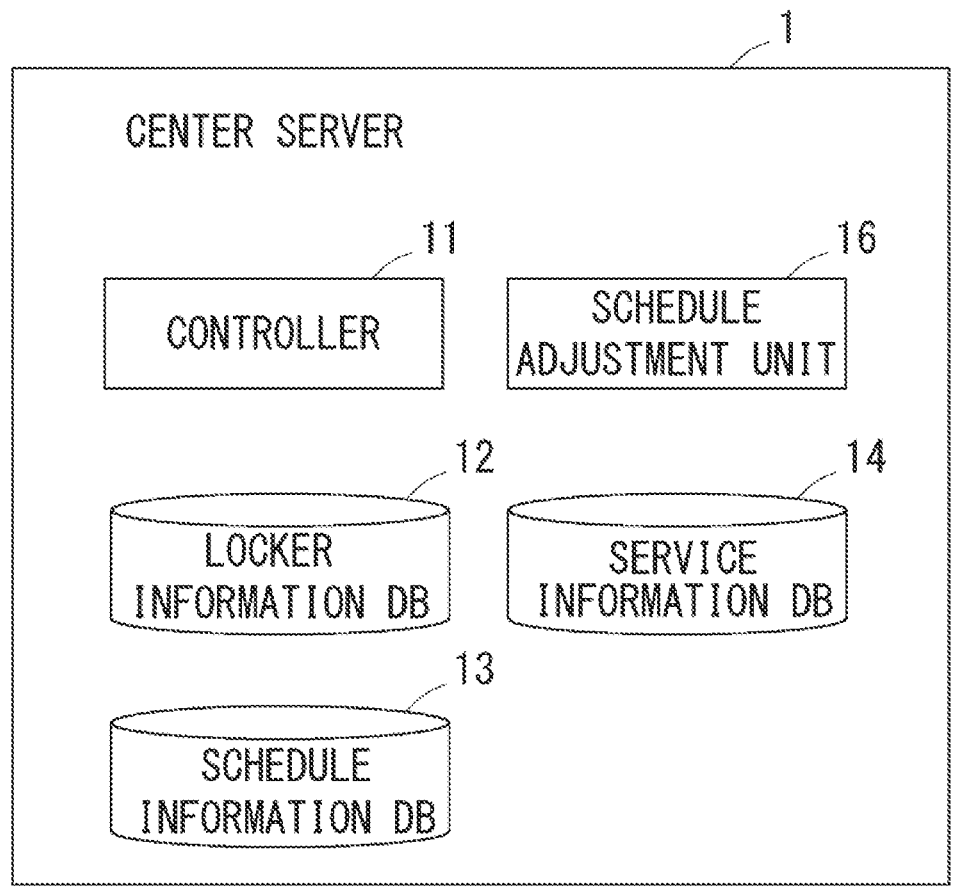
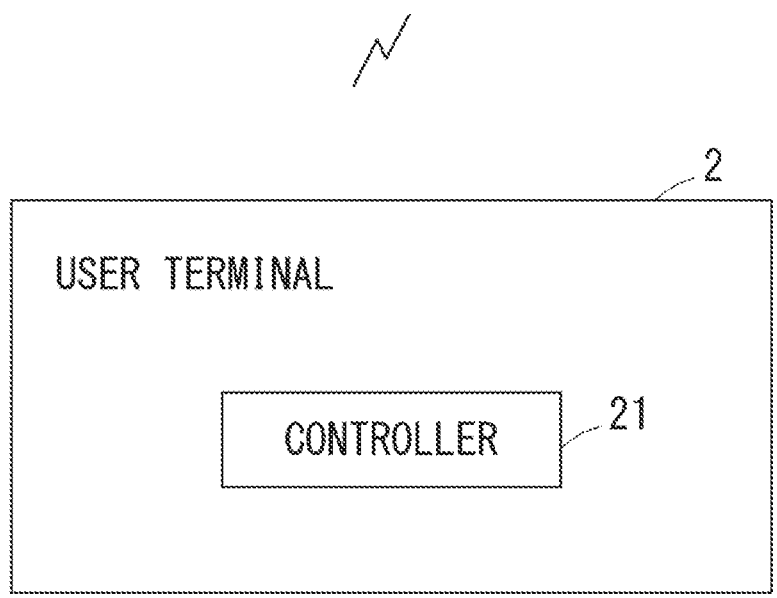

Fig. 4

| LOCKER ID | VEHICLE ID | KEY INFORMATION |
|---|---|---|
|  |  |  |
|  |  |  |
|  |  |  |

Fig. 5

| SERVICE ID | USER ID | LOCKER ID | STORAGE DATE AND TIME | STORAGE PLACE | TAKING OUT DATE AND TIME | TAKING OUT PLACE | TAKING OUT COMPLETION NOTIFICATION | REQUEST TIME TERMINAL INFORMATION |
|---|---|---|---|---|---|---|---|---|
| 001 | U01 | | YYYY/MM/DD /8:15 | P001 | YYYY/MM/DD /14:00 | | | |
| | | | | | | | | |
| | | | | | | | | |

Fig. 7

```
LOCKER USE REQUEST SCREEN

STORAGE      ○  [INPUT KEYWORD]   (SEARCH)
PLACE
             ○  SELECT FROM MAP

○  SELECT FROM AMONG
                REGISTERED ADDRESSES

STORAGE    YEAR    DATE    HOUR   MINUTE
DATE AND   [ ▼ ]   [ ▼ ]   [ ▼ ]  [ ▼ ]
TIME

⇩

TAKING OUT   ○  [INPUT KEYWORD]   (SEARCH)
PLACE
             ○  SELECT FROM MAP

○  SELECT FROM AMONG
                REGISTERED ADDRESSES

TAKING     YEAR    DATE    HOUR   MINUTE
OUT DATE   [ ▼ ]   [ ▼ ]   [ ▼ ]  [ ▼ ]
AND TIME (START REQUEST)   (CANCEL)
```

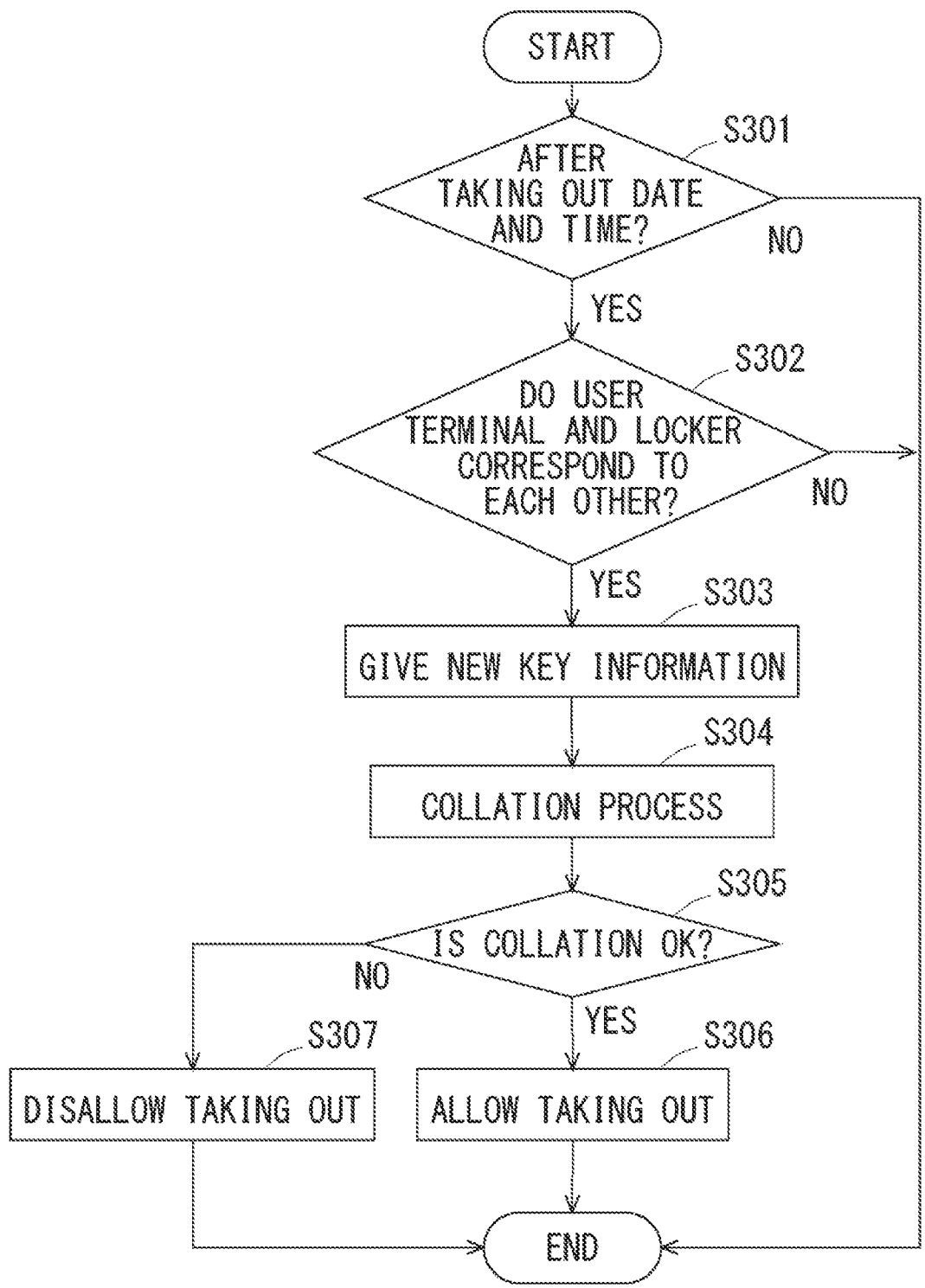

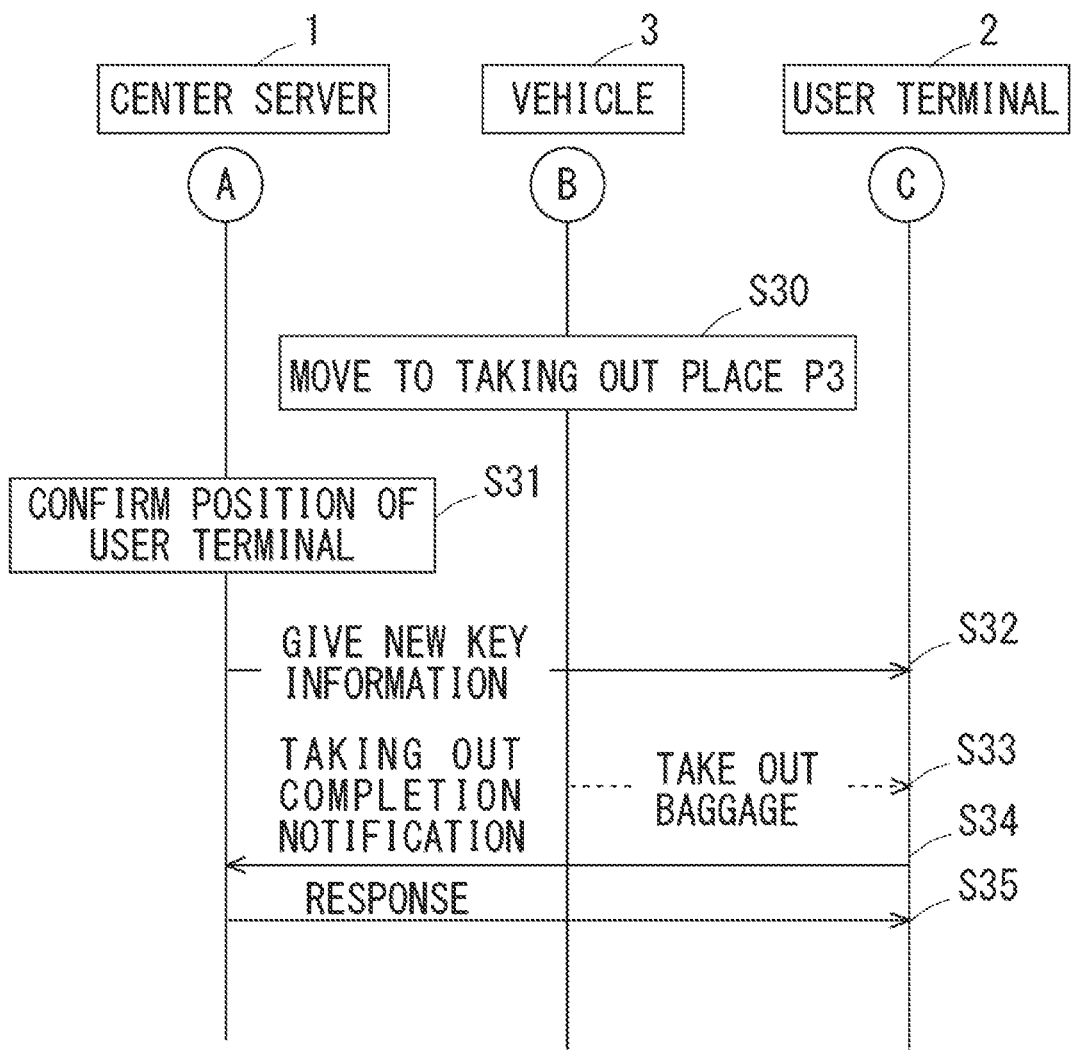

ENHANCED LOCKER SECURITY APPARATUS AND METHOD

CROSS REFERENCE TO THE RELATED APPLICATION

This application claims the benefit of Japanese Patent Application No. 2021-150080, filed on Sep. 15, 2021, which is hereby incorporated by reference herein in its entirety.

BACKGROUND

Technical Field

The present disclosure relates to an information processing apparatus, a non-transitory storage medium and a method.

Description of the Related Art

A locker management system has been disclosed in which a locker to be used by a user is decided based on a locker use request by the user, and a self-driving vehicle provided with the decided locker is dispatched to the user (for example, Japanese Patent Laid-Open No. 2019-96201).

[Patent document 1] Japanese Patent Laid-Open No. 2019-96201.

SUMMARY

One or more aspects of the present disclosure are directed to provide an information processing apparatus that enhances security of a service of storing baggage in a locker loaded in a vehicle, a non-transitory storage medium and a method.

One of aspects of the present disclosure may be an information processing apparatus comprising a controller including at least one processor configured to, for baggage stored in a locker loaded in a vehicle, make a notification that confirms unlocking of the locker to a user terminal associated with the baggage, with a locked state of the locker being maintained, when a predetermined event related to unlocking of the locker is detected before a first date and time set in advance.

One of other aspects of the present disclosure may be a non-transitory storage medium storing a program, the program causing a computer, for baggage stored in a locker loaded in a vehicle, to make a notification that confirms unlocking of the locker to a user terminal associated with the baggage, with a locked state of the locker being maintained, when a predetermined event related to unlocking of the locker is detected before a first date and time set in advance.

One of the other aspects of the present disclosure may be an information processing method comprising:

for baggage stored in a locker loaded in a vehicle, a computer making a notification that confirms unlocking of the locker to a user terminal associated with the baggage, with a locked state of the locker being maintained when a predetermined event related to unlocking of the locker is detected before a first date and time set in advance; and the computer deciding whether or not to take out the baggage from the locker based on an answer to the notification from the user terminal.

According to the present disclosure, it is possible to enhance security of a service of storing baggage in a locker loaded in a vehicle.

BRIEF DESCRIPTION OF THE DRAWINGS

FIG. 3 is a diagram illustrating examples of functional configurations of the center server and the user terminal;

FIG. 4 illustrates an example of information held in a locker information database;

FIG. 5 illustrates an example of information held in a service information database;

FIG. 7 illustrates an example of a locker use request screen of the user terminal;

FIG. 11 is a flowchart about a baggage taking out management process by the center server in a case where key information is invalidated;

FIG. 12B is a diagram illustrating the example of the sequence of the process in the mobile locker system.

DESCRIPTION OF THE EMBODIMENTS

Figure 1:
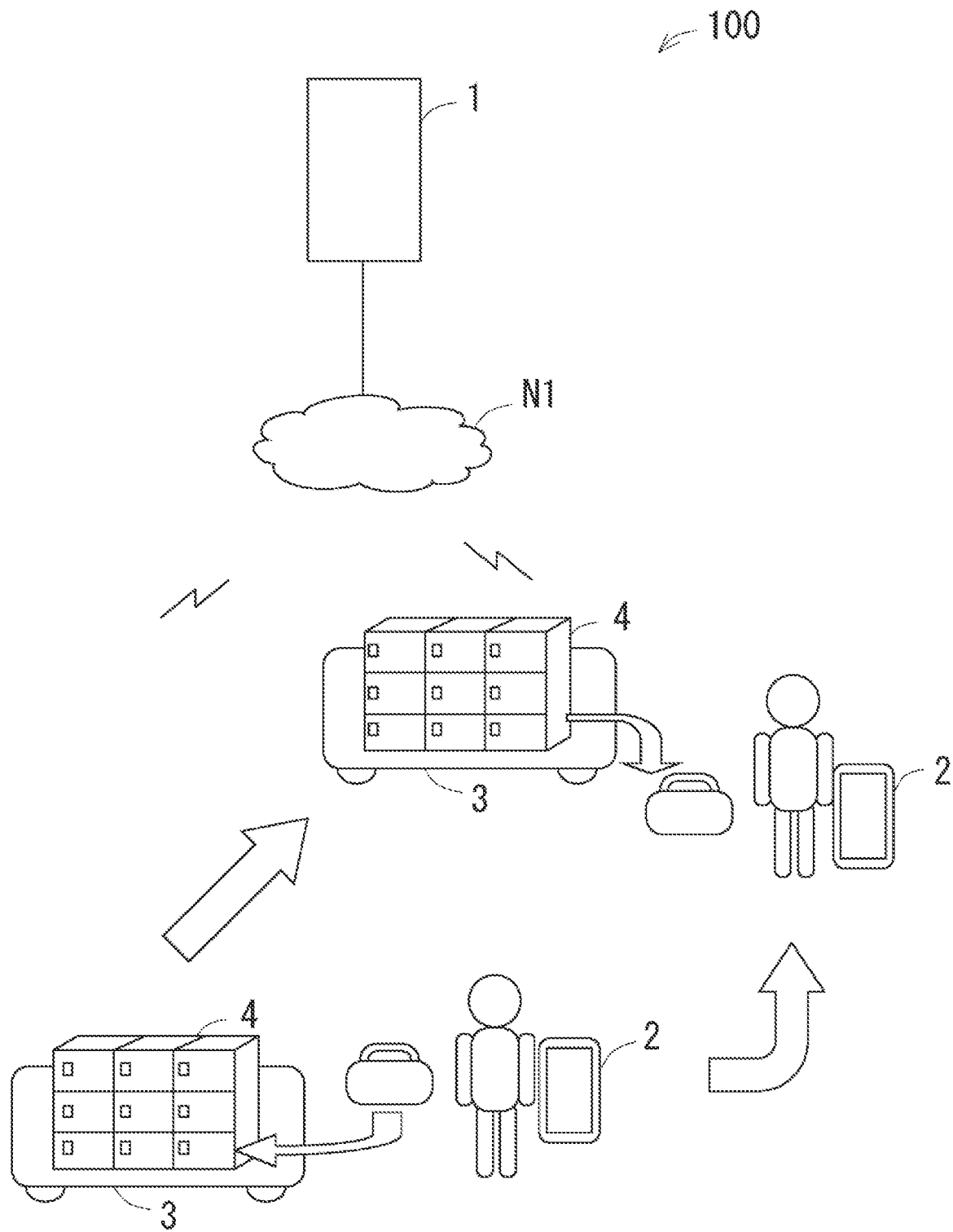
FIG. 1 is a diagram illustrating an example of a system configuration of a mobile locker system.

There is a system that provides a temporary baggage storage service which makes it possible to store or take out baggage into or from a locker at a place specified by a user by movement of a vehicle loaded with the locker. A locker that is loaded in a vehicle and movable will be hereinafter referred to as a mobile locker. The temporary baggage storage service by the mobile locker will be hereinafter referred to as a mobile locker service or simply as a service.

When using the mobile locker service, a user specifies, for example, a place and a date and time at which baggage is to be stored and a place and a date and time at which the baggage is to be taken out. It should be avoided to disclose the information to those other than the user in order to protect the baggage from theft and the like. Further, it is common to provide some locking device for the locker so that the baggage stored in the locker is not illegally taken out by a third person other than the user. However, when the information about the storage of the baggage by the user leaks to the outside, or information, a key or the like for unlocking the locking device falls into a third person's hands for some reason, the possibility of theft of the baggage stored by the user increases.

Therefore, in one of aspects of the present disclosure, a notification may be made to the user when the locker is about to be unlocked before the date and time set in advance by the user for taking out. Specifically, the one of the aspects of the present disclosure may be an information processing apparatus including a controller including at least one processor. For baggage stored in a locker loaded in a vehicle, the controller may execute making a notification that confirms unlocking of the locker to a user terminal associated with the baggage, with a locked state of the locker being maintained, when a predetermined event related to unlocking of the locker is detected before a first date and time set in advance.

The information processing apparatus is, for example, a computer such as a server. The controller is, for example, a processor such as a CPU (central processing unit) provided in the computer. The user terminal is, for example, a smartphone, a tablet terminal, a PC (personal computer) or the like. The vehicle may be either a vehicle that travels by driving by a driver or a self-traveling vehicle capable of traveling without driving by a driver. The locker loaded in the vehicle corresponds to a mobile locker.

As for the storage of the baggage into the locker, the baggage and the user terminal that the user possesses may be associated at the time of the storage. Further, the first date and time may be a date and time when the baggage is to be taken out, which is set in advance by the user. Therefore, the user may act to take out the baggage from the locker according to the first date and time he himself set. On the other hand, in order for a third person to illegally take out the baggage, the third person may access the vehicle loaded with the locker to unlock the locker at a timing earlier than the first date and time.

Therefore, when a predetermined event related to unlocking of the locker is detected before the first date and time, it may mean that there is a considerable possibility of illegal taking out of the baggage by a third person. Therefore, the controller may be configured to make a notification that confirms unlocking to the user terminal. As examples of the predetermined event, a collation may act for the locker using predetermined information corresponding to key information for unlocking the locker when the locker can be locked/unlocked with an electronic key, a third person's act of attempting to change a travel plan of the vehicle loaded with the locker in order to access the locker, and the like can be exemplified. In addition, when the locker can be locked/unlocked with a physical key, an act of attempting to unlocking the locker with the physical key can also correspond to the predetermined event.

According to the one of the aspects of the present disclosure, by, when it is thought that the possibility of illegal taking out of the baggage by a third person is high, making the notification that confirms unlocking to the user terminal with the locked state of the locker being maintained, it is possible to cause the user who actually stored the baggage to pay attention. Thereby, when taking out of the baggage that the user does not recognize is about to occur, the user can act to hinder the taking out. Thus, it is possible to enhance security of the mobile locker. When the taking out is recognized by the user, the taking out can be allowed. That is, the controller may be configured to allow taking out the baggage from the locker when receiving an answer to approve to take out the baggage, from the user terminal that has received the notification. Due to this configuration, convenience of the mobile locker is enhanced.

Here, as for the aspect of the notification to the user terminal by the controller, three forms will be exemplified below. However, the notification aspect of the present disclosure is not limited to the aspect below but can include other forms. First, in a first form, the controller may be configured to make the notification to the user terminal, when the predetermined event is detected and the user terminal is not located within a predetermined range where the locker is included. The predetermined range in this form is assumed to be a range relatively close to the locker, such a range that the user who possesses the user terminal can sufficiently confirm taking out of the baggage by a third person when the user exists within the range. Therefore, when the user terminal does not exist in such a predetermined range, the user cannot confirm behavior of a third person. When a predetermined event is detected in such a case, the above notification is executed, and, thus, it is possible to enhance security of the mobile locker.

In a second form, the controller may be configured to make the notification to the user terminal, when the predetermined event is detected and a position of the user terminal does not correspond to a position of the locker. When the position of the user terminal corresponds to the position of the locker, it is thought that the user can more favorably confirm an action of a third person. Therefore, in such a case, the necessity of making the notification is low. Therefore, by executing the above notification when the position of the user terminal does not correspond to the position of the locker and a predetermined event is detected, security can be enhanced.

In a third form, the controller may be configured to make the notification to the user terminal, when the predetermined event is detected and at least one of the user terminal and the vehicle is not located within a predetermined range that includes a first position for taking out the baggage that is set in advance. Taking out of baggage from a locker loaded in a vehicle is usually performed when the vehicle is stopped. Therefore, it is thought that, when both of the vehicle loaded with the locker and the user terminal possessed by the user exist in a predetermined range with a first position where taking out of the baggage originally should be performed by the user as a reference, taking out of the baggage by a third person can be sufficiently confirmed. Therefore, when at least one of the vehicle and the user terminal does not exist in such a predetermined range, the user cannot confirm behavior of a third person. Therefore, in such a case, by the above notification being executed when a predetermined event is detected, it is possible to enhance security of the mobile locker.

Here, the notification may further include information about the predetermined event. As the information about the predetermined event, information indicating unlocking means, picked-up image information obtained by picking up an image of a person who is performing a motion related to a predetermined event, and the like can be exemplified. By making such a notification, the user who receives the notification can appropriately judge whether illegal taking out of the baggage by a third person is performed or not.

Here, the controller may be configured to give key information for unlocking the locker to the user terminal at the time of storage of the baggage by the user. That is, locking/unlocking of the locker is electronically performed using key information. In such a form, illegal taking out of baggage by a third person can occur when the third person maliciously or accidentally obtains information corresponding to the key information. Therefore, the predetermined event can be a collation act using predetermined information corresponding to the key information for unlocking the locker.

In such a case, the user who receives the notification recognizes an illegality by a third person, and the controller may be configured to transmit an instruction to disable unlocking of the locker by the key information, to the locker when receiving an answer not to approve to take the baggage from the user terminal that has received the notification. Thereby, it is possible to prevent illegal taking out of the baggage by the third person.

Further, the controller may be configured to give new key information for unlocking the locker to the user terminal when detecting a state that a position of the user terminal corresponds to a position of the locker after invalidating the key information. By keeping the key information invalid, illegal taking out of the baggage by the third person can be prevented, but legal taking out by the user is also hindered, which is inconvenient. When the position of the user terminal is in a state of corresponding to the position of the locker, it can be thought that taking out of the baggage by the user can be immediately performed, and an illegality by a third person is difficult to occur. Therefore, by giving new key information in such a state, convenience for the user can be secured.

As another form of illegal taking out of the baggage by a third person, change of a travel plan of a vehicle that is not intended by the user is thought. In such a case, the predetermined event can be a request to change a travel plan of the vehicle until the baggage is taken out, the request being made by an external apparatus other than the user terminal.

In such a case, the user who receives the notification recognizes an illegality by a third person, and the controller may be configured to reject the change request from the external apparatus and inquire of the user terminal about a new travel plan when receiving an answer not to approve to take out the baggage from the user terminal that has received the notification. Thereby, it is possible to prevent illegal taking out of the baggage by a third person, and the user can safely take out his baggage. It is possible to realize both of security and convenience of the mobile locker.

As one of the other aspects, the present disclosure can be identified as a non-transitory computer-readable recording medium that stores a program. The non-transitory computer-readable recording medium that stores the program causes a computer, for baggage stored in a locker loaded in a vehicle, to make a notification that confirms unlocking of the locker to a user terminal associated with the baggage, with a locked state of the locker being maintained, when a predetermined event related to unlocking of the locker is detected before a first date and time set in advance. The computer is, for example, a computer that operates as the information processing apparatus described above. Further, the technical idea disclosed with regard to the information processing apparatus described above can be also applied to the above non-transitory computer-readable recording medium that stores the program within a range not causing technological inconsistency to occur.

Further, as one of the other aspects, the present disclosure can be identified as an information processing method executed by a computer. The information processing method comprises:

for baggage stored in a locker loaded in a vehicle, a computer making a notification that confirms unlocking of the locker to a user terminal associated with the baggage, with a locked state of the locker being maintained when a predetermined event related to unlocking of the locker is detected before a first date and time set in advance;

and the computer deciding whether or not to take out the baggage from the locker based on an answer to the notification from the user terminal. The computer is, for example, a computer that operates as the information processing apparatus described above. Further, the technical idea disclosed with regard to the information processing apparatus described above can be also applied to the above information processing method within a range not causing technological inconsistency to occur.

Embodiments of the present disclosure will be described below based on drawings. Configurations of the embodiments below are examples, and the present disclosure is not limited to the configurations of the embodiments.

First Embodiment

FIG. 1 is a diagram illustrating an example of a system configuration of a mobile locker system 100 according to a first embodiment. The mobile locker system 100 is a system that provides a mobile type locker by causing a vehicle to travel being loaded with a locker. A user can store baggage into the locker at a specified place, includes the baggage stored for a predetermined period and take out the baggage from the locker at a specified place. The place where the baggage is stored and the place where the baggage is taken out may be different. A usage fee is charged to the user, for example, according to the length of time for which the baggage is stored, a distance between the place where the baggage is stored and the place where the baggage is taken out, and the like.

The mobile locker system 100 includes a center server 1, lockers 4, vehicles 3 loaded with the lockers 4, and user terminals 2 of users who use the service. Note that, though the mobile locker system 100 can include a plurality of lockers 4, vehicles 3 and user terminals 2, one locker 4, one vehicle 3 and one user terminal 2 are illustrated in FIG. 1 for convenience.

Each locker 4 is provided with a plurality of storage units in one cabinet. Each storage unit provided for the locker 4 can be separately locked/unlocked. In the first embodiment, it is assumed that an electronic lock is adopted for each storage unit of the locker 4. For example, the electronic lock adopted for each locker 4 may be such that is locked by operating an input device such as a numeric keypad provided for each storage unit and unlocked by inputting an identification number to the input device. Or alternatively, the electronic lock adopted for each locker 4 may be such that is provided with a receiver for a predetermined wireless signal and, for example, a locking or unlocking signal is transmitted together with key information from a user terminal 2, and the electronic lock performs locking or unlocking when key information held by the receiver on the locker 4 side and the key information transmitted from the user terminal 2 correspond to each other. However, a lock adopted for each locker 4 is not limited to an electronic lock, but the lock may be locked or unlocked with a physical key. Though baggage of the user is stored into one storage unit of the locker 4, the one storage unit of the locker 4 may be referred to simply as "a locker 4" below.

In the first embodiment, each vehicle 3 is assumed to be an autonomous vehicle. However, a staff member who assists storage or taking out of baggage may be in the vehicle 3. As another method, the vehicle 3 may be a vehicle that travels by driving by a driver. When the vehicle 3 is a vehicle that travels by driving by a driver, the staff member who performs user support may be the same person as the driver. Further, the vehicle 3 may travel in an on-demand method in which the vehicle 3 travels in response to occurrence of a request to use the service or may travel making rounds on a predetermined route. In the first embodiment, the vehicle 3 is assumed to travel on an on-demand method.

Each user terminal 2 is a terminal possessed by a user who uses the service of the mobile locker system 100. The user terminal 2 is, for example, a smartphone, a tablet terminal, a PC (personal computer) or the like. In the user terminal 2, an application program for using the service of the mobile locker system 100 is installed.

Each user terminal 2 and each vehicle 3 are connected to a network N1 and communicate with the center server 1 via the network N1. The network N1 is, for example, a public network such as the Internet. For example, the vehicle 3 is loaded with an apparatus provided with a communication function and can connect to the network N1 by the apparatus to communicate with the center server 1. Each locker 4 is also connected to the network N1. Information about an operation act and the like for locking/unlocking of the locker 4 is supplied to the center server 1 via the network N1, and predetermined information (for example, key information or the like for locking/unlocking) is supplied to the locker 4 from the center server 1.

The center server 1 is a server that manages the mobile locker system 100. When using the service of the mobile locker system 100, a user transmits a locker use request to the center server 1 through the application program of a user terminal 2. Information about a place and a date and time at which baggage is stored and a place and a date and time at which the baggage is taken out, which are specified by the user, is also transmitted to the center server 1 together with the locker use request. The date and time when the baggage is taken out is an example of "a first date and time", and the place where the baggage is taken out is an example of "a first position".

When receiving the locker use request from the user terminal 2, the center server 1 decides a vehicle 3 to be dispatched to the specified place at the specified date and time, and a storage unit among storage units of a locker 4 loaded in the vehicle 3, into which the baggage is to be stored. In the first embodiment, since an electronic lock is adopted for each locker 4, the center server 1 notifies the user terminal 2 of key information about the locker 4. After that, the user meets the vehicle 3 at the specified place, gets into the vehicle 3 to store the baggage into the locker 4, and locks the locker 4 using the key information received from the center server 1. In the case of taking out the baggage, the user meets the vehicle 3 at the place specified in advance, gets into the vehicle 3 to unlock the locker 4 using the key information received from the center server 1, and takes out the baggage from the locker 4.

Here, since the key information for locking/unlocking the locker 4 is notified to the user terminal 2, the key information is known basically only by the user, and, therefore, security of the locker 4 is kept. However, there is a possibility that information about use of the locker 4 including the key information is illegally acquired by a third person for a reason such as a communication trouble, a trouble in management of the user terminal 2 or the like. In such a case, it may happen that the third person accesses the locker 4 and illegally takes out the baggage before the user who stored the baggage into the locker 4 takes out the baggage. Therefore, in the mobile locker system 100, in order to favorably prevent such an illegality, when an event which may possibly cause illegal taking out of the baggage by a third person is detected, a notification that confirms unlocking is made to the user terminal before the locker 4 is unlocked, that is, in a state of the locker 4 being locked. The reason for making the notification to the user terminal is that, on the assumption that the user terminal is possessed by the user, even when the key information for unlocking is illegally known by a third person, it is possible to confirm the user's intention to take out the baggage by the user himself using the user terminal as far as the user possesses the user terminal.

As the event which may possibly cause illegal taking out of the baggage by a third person, the following can be exemplified. First, a collation act using information corresponding to the key information for unlocking the locker 4, that is, information that is substantially equal to the key information can be exemplified. Specifically, the collation act is an act of a third person inputting a password for unlocking or transmitting information for unlocking to the locker 4. Second, an act of requesting change of a travel plan of the vehicle 3 loaded with the locker 4 can be exemplified. Specifically, the act is an act of a third person requesting to change the first date and time or the first position. In addition, when each locker 4 is configured to be locked/unlocked using a physical key, an act of inserting the physical key into a key hole can be also given as an example of the event.

According to the first embodiment as described above, when a predetermined act related to unlocking of a locker 4 is detected before the first date and time set in advance, a notification is made to a user terminal to confirm a user's intention in consideration of the possibility of illegal taking out of baggage by a third person. Thereby, it is possible to, when the predetermined act is not intended by the user, favorably avoid illegal taking out of the baggage by a third person by disallowing unlocking of the locker 4, and it is possible to enhance security of the locker 4.

Figure 2:
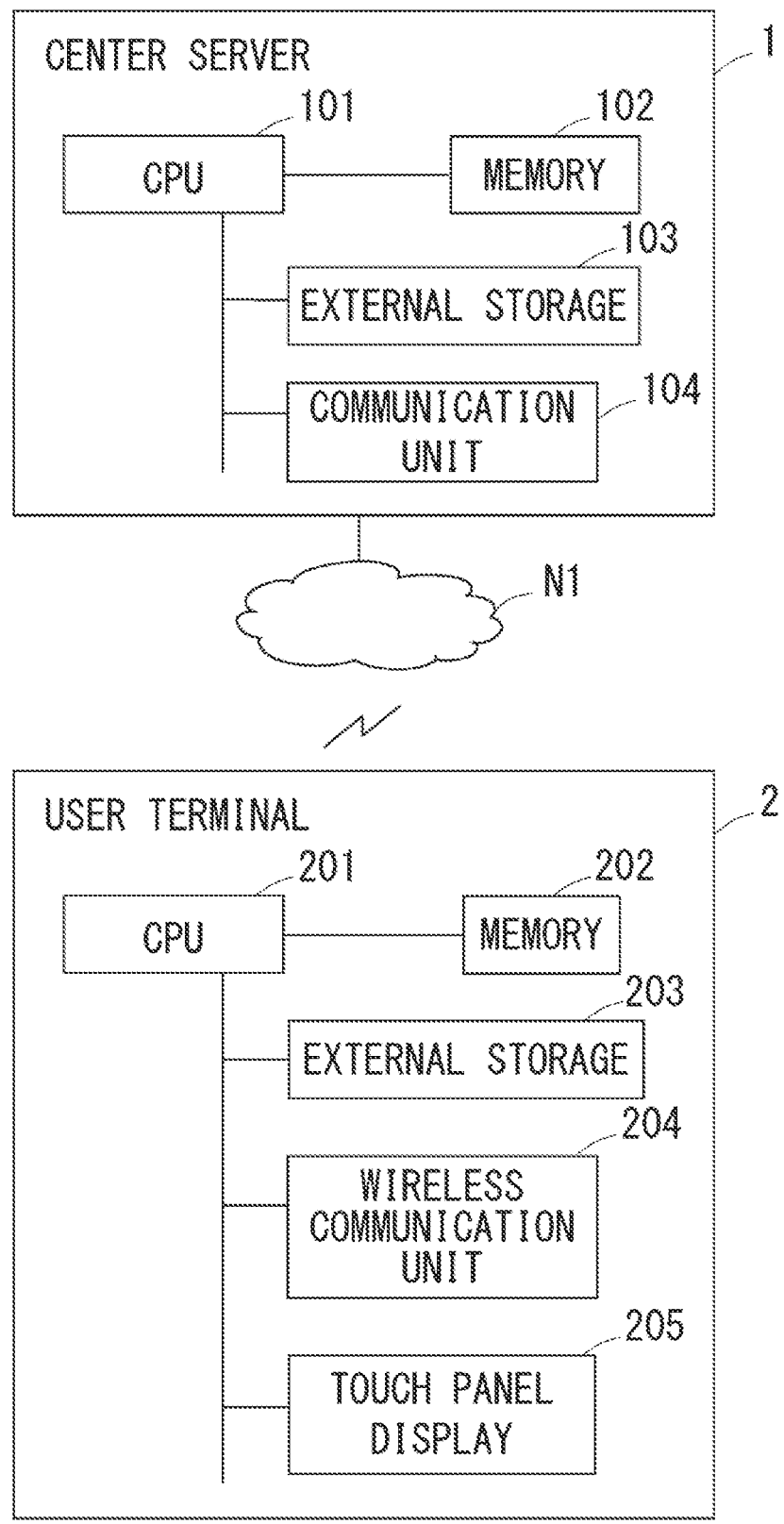
FIG. 2 illustrates examples of hardware configurations of a center server and a user terminal.

FIG. 2 illustrates examples of hardware configurations of the center server 1 and each user terminal 2. The center server 1 is, for example, a computer exclusively used as a server or a computer. The center server 1 is provided with a CPU 101, a memory 102, an external storage 103 and a communication unit 104 as hardware components. The memory 102 and the external storage 103 are computer-readable recording media. The center server 1 is an example of "an information processing apparatus".

The external storage 103 stores various programs and data used by the CPU 101 at the time of executing each program. The external storage 103 is, for example, an EPROM (erasable programmable ROM) or a hard disk drive. The programs held in the external storage 103 include, for example, an operating system (OS), a control program for the mobile locker system 100, and other various application programs.

The memory 102 is a storage that provides a storage area where a program stored in the external storage 103 is to be loaded and a work area for the CPU 101, and is used as a buffer. As the memory 102, for example, semiconductor memories like a ROM (read-only memory) and a RAM (random access memory) are included.

The CPU 101 executes various processes by loading the OS and other various application programs stored in the external storage 103 to the memory 102 and executing them. The number of CPUs 101 is not limited to one, but a plurality of CPUs 101 may be provided. The CPU 101 is an example of "a controller".

The communication unit 104 is, for example, a NIC (network interface card) or the like. For example, the communication unit 104 connects to an access network such as a LAN (local area network) by wire and connects to the network N1 through the access network. The communication unit 104, however, is not limited to a circuit that connects to a network by wire but may be, for example, a wireless communication circuit according to a wireless communication method such as WiFi (registered trademark) or a mobile communication method.

The user terminal 2 is, for example, a smartphone, a tablet terminal, a wearable terminal, a PC (personal computer) or the like. The user terminal 2 is provided with a CPU 201, a memory 202, an external storage 203, a wireless communication unit 204 and a touch panel display 205 as hardware components. However, hardware components that perform processes according to the first embodiment are extracted and illustrated as the hardware configuration of the user terminal 2 in FIG. 2, and hardware components included in the user terminal 2 are not limited to the components illustrated in FIG. 2.

Since the CPU 201, the memory 202 and the external storage 203 are similar to the CPU 101, the memory 102 and the external storage 103, respectively, detailed description thereof will be omitted. A storage adopted as the external storage 203 is, for example, a flash memory. As the external storage 203, a removable recording medium such as an SD card may be included. In the external storage 203, the application program for using the service of the mobile locker system 100 is also held in addition to the OS and the like.

The wireless communication unit 204 is, for example, a wireless communication circuit according to a mobile communication method such as 5G (5th Generation), 6G, 4G, LTE (Long Term Evolution) or the like and a wireless communication method such as WiMAX (registered trademark) or WiFi (registered trademark). The wireless communication unit 204 connects to the network N1 by wireless communication to enable communication with the center server 1.

According to an instruction from the CPU 201, the touch panel display 205 outputs an image and the like about information to be communicated to the user, and accepts an input from the user to output the inputted signal to the CPU 201.

The hardware configurations of the center server 1 and the user terminal 2 illustrated in FIG. 2 are mere examples, and the hardware configurations of the center server 1 and the user terminal 2 are not limited to those illustrated in FIG. 2. For example, the user terminal 2 can also include a microphone, a speaker, a camera, a position sensor such as a GPS (Global Positioning System) and the like as the hardware configuration in addition to the hardware components illustrated in FIG. 2.

FIG. 3 is a diagram illustrating examples of functional configurations of the center server 1 and each user terminal 2. The center server 1 is provided with a controller 11, a schedule adjustment unit 16, a locker information DB 12, a schedule information DB 13 and a service information DB 14 as functional components. These functional components are realized, for example, by the CPU 101 of the center server 1 executing the control program for the mobile locker system 100.

The controller 11 manages the use state of each locker 4 and controls travel of each vehicle 3. Specifically, the controller 11 receives, for example, a locker use request, a storage completion notification, a taking out completion notification and the like from a user terminal 2. The locker use request is a request to use a mobile locker. The storage completion notification is a notification that storage of baggage into a locker 4 has been completed. The taking out completion notification is a notification that baggage stored in the locker 4 has been taken out from the locker 4.

When receiving the locker use request from the user terminal 2, the controller 11 performs assignment of a vehicle 3 and a locker 4. From the user terminal 2, a place and a date and time at which baggage is stored, a place and a date and time at which the baggage is taken out, identification information about the user and identification information about the user terminal 2 are also transmitted to the center server 1 together with the locker use request. Hereinafter, the place and the date and time at which the baggage is stored may be referred to as a storage place and a storage date and time, respectively. The place and the date and time at which the baggage is taken out may be referred to as a taking out place and a taking out date and time, respectively.

For example, the controller 11 decides the vehicle 3 and the locker 4 to be assigned to the locker user request, with reference to the schedule information DB 13 described later. For example, the vehicle 3 assigned to the locker use request is a vehicle that travels near the storage place at the storage date and time and is loaded with a locker 4 including a storage unit that is not scheduled from the storage date and time to at least the taking out date and time. Further, the locker 4 assigned to the locker use request is any of storage units that are not scheduled from the storage date and time to at least the taking out date and time, among storage units of the locker 4 loaded in the vehicle 3. A method for deciding the vehicle 3 and the locker 4 to be assigned is any of well-known methods and is not limited to a particular method.

The vehicle 3 and the locker 4 for storing the baggage may be specified by the user based on position information about the vehicles 3 on a map. In this case, identification information about the vehicle 3 specified by the user is received from the user terminal 2 together with the locker use request. Further, the controller 11 assigns any of storage units of the locker 4 loaded in the specified vehicle 3, which are not scheduled from the storage date and time to the taking out date and time, to the received locker use request.

After that, the controller 11 creates schedules of the assigned vehicle 3 and locker 4, for the service of the received locker use request, and registers the created schedules with the schedule information DB 13 described later. Further, the controller 11 creates a travel plan of the vehicle 3 so that the vehicle 3 arrives at the storage place specified by the user at the storage date and time specified by the user and arrives at the taking out place specified by the user at the taking out date and time specified by the user, according to the schedule created for the assigned vehicle 3. The created travel plan is transmitted to the vehicle 3. The travel plan includes, for example, the destinations of travel, the arrival dates and time, information about routes to the destinations, and the like.

The controller 11 transmits an acceptance response to the locker use request, information about the assigned locker 4, the storage place and the storage date and time to the user terminal 2. The information about the locker 4 includes, for example, identification information about the vehicle 3 and identification information about the storage unit of the locker 4. Further, since it is assumed that each locker 4 adopts electronic keys in the first embodiment, the information about the locker 4 also includes key information about the storage unit assigned to the user terminal 2. However, the information about the locker 4 is not limited thereto. Since there is a possibility that the storage unit assigned to the locker use request may be changed because of other locker use requests, the information about the locker 4 may be transmitted to the user terminal 2 separately from the acceptance response to the locker use request. For example, the information about the assigned locker 4 may be transmitted to the user terminal 2 at predetermined time, which is a predetermined time before the storage date and time, after transmission of the acceptance response.

When receiving a storage completion notification or a taking out completion notification from the user terminal 2, the controller 11 may record the notification, for example, to a predetermined storage area of the external storage 103 as an event history. For example, identification information about the service and the identification information about the user are also received together with the storage completion notification or the taking out completion notification. Further, when receiving the taking out completion notification from the user terminal 2, the controller 11 records the notification to the service information DB 14 described later.

When an event related to illegal taking out of the baggage by a third person, that is, a predetermined event related to unlocking of the locker 4 at a timing before the taking out date and time set for the locker 4 in advance is detected, the controller 11 also makes a notification for confirming the user's intention about the predetermined event, that is, the user's intention of unlocking, to the user terminal 2. Further, the schedule adjustment unit 16 adjusts the schedules of the specified vehicle 3 and locker 4 in consideration of a plurality of services assigned to the vehicle 3 and the locker 4 according to an instruction from the controller 11 so that taking out of the baggage by the user is safely performed. In the adjustment of the schedules, for example, storage units assigned to other services are changed. A method for adjusting the schedules is not limited to a particular method. The schedule adjustment unit 16 notifies the controller 11 of change in the schedules. In this case, according to the changed schedules, for example, the controller 11 changes the travel plan of the vehicle 3 corresponding to the relevant services or notify user terminals 2 of change of the storage units assigned to the relevant services. Details of the process about the above the notification by the controller 11 and the adjustment process by the schedule adjustment unit 16 will be described later.

Here, the locker information DB 12, the schedule information DB 13 and the service information DB 14 will be described. These DBs (databases) are created, for example, in a storage area of the external storage 103 of the center server 1. The locker information DB 12 holds information about each locker 4. The schedule information DB 13 holds information about a schedule of each locker 4. The service information DB 14 holds service information about use of a mobile locker. The service information is information about a mobile locker service provided for one locker use request. Details of the information held in the locker information DB 12, the schedule information DB 13 and the service information DB 14 will be described later.

Next, the functional configuration of each user terminal 2 will be described. The user terminal 2 is provided with a controller 21 as a functional component. A process of the controller 21 is achieved by the CPU 201 of the user terminal 2 executing the application program for the mobile locker system 100 held in the external storage 203. In response to an input from the user to the touch panel display 205, the controller 21 transmits, for example, a locker use request, a storage completion notification, a taking out completion notification, and responses to various kinds of inquiries to the center server 1. The controller 21 receives, for example, responses to the locker use request and the like and accompanying information from the center server 1. Further, the controller 21 causes a screen to transition according to a user operation or outputs information received from the center server 1 to the touch panel display 205. The functional configurations of the center server 1 and the user terminal 2 are mere examples, and the functional configurations of the center server 1 and the user terminal 2 are not limited to those illustrated in FIG. 3.

Figure 4:
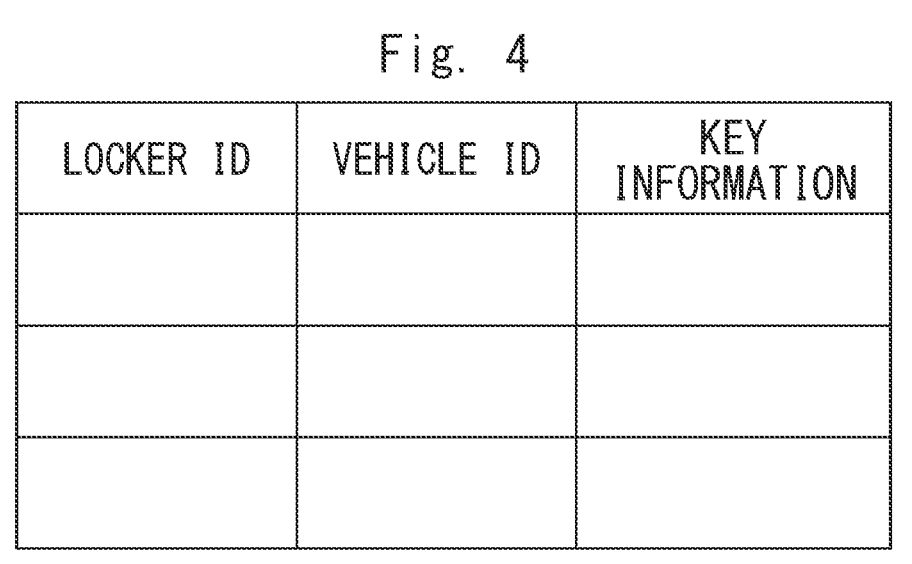

Here, information held in each DB (database) will be described. FIG. 4 illustrates an example of information held in the locker information DB 12. The locker information DB 12 holds information about each locker 4. One record of the locker information DB 12 illustrated in FIG. 4 indicates information about one storage unit of the locker 4. One record of the locker information DB 12 illustrated in FIG. 4 includes locker ID, vehicle ID and key information fields.

In the locker ID field, identification information about each storage unit of the locker 4 is stored. For example, the identification information about each storage unit of the locker 4 is a character string of a predetermined number of alphanumerics and is configured with a higher part indicating the locker 4 and a lower part indicating the storage unit. Among a plurality of storage units included in the same locker 4, the value of the higher part of the identification information indicating the locker 4 is the same value.

In the vehicle ID field, identification information about a vehicle 3 loaded with the locker 4 including the storage unit is stored. In the key information field, key information about an electronic lock provided for the storage unit is stored. The key information about the storage unit may be fixed or variable. The information held in the locker information DB 12 illustrated in FIG. 4 is a mere example, and the information held in the locker information DB 12 is not limited to that illustrated in FIG. 4.

Next, FIG. 5 illustrates an example of information held in the service information DB 14. The service information DB 14 holds service information. One record of the service information DB 14 illustrated in FIG. 5 indicates service information about a service provided for one locker use request. One record of the service information DB 14 illustrated in FIG. 5 includes service ID, user ID, locker ID, storage date and time, storage place, taking out date and time, taking out place, taking out completion notification and request time terminal information fields.

In the service ID field, identification information about the service is stored. The identification information about the service is assigned by the controller 11 when provision of the service is established for a received locker use request. In the user ID field, identification information about a user is stored. The identification information about the user is assigned by the controller 11 when user registration with the mobile locker system 100 is performed. The user registration with the mobile locker system 100 is performed through a client application for the mobile locker system 100. In the locker ID field, identification information about a storage unit of a locker 4 assigned to the service is stored.

In the storage date and time, storage place, taking out date and time and taking out place fields, pieces of information indicating a storage date and time, a storage place, a taking out date and time and a taking out place are stored, respectively. The information indicating the storage place and the taking out place is, for example, an address, a latitude and longitude, a landmark name or the like. The storage date and time and the taking out date and time are indicated, for example, by a year, month, date, hour and minutes.

In the taking out completion notification field, information indicating whether a taking out completion notification indicating that baggage has been taken out from the locker 4 assigned to the relevant service has been received or not is stored. The information indicating whether a taking out completion notification has been received or not is, for example, a flag, a code or a keyword.

In the request time terminal information field, identification information about a user terminal 2 used at the time of the locker use request, that is, information that can identify the individual terminal is stored. The request time terminal information is transmitted at the time of executing the locker use request by the client application for the mobile locker system 100, to the center server 1 together with the request from the user terminal 2 as the terminal information about the user terminal 2.

When the controller 11 receives a locker use request from a user terminal 2, and provision of a service is established, the controller 11 adds a record to the service information DB 14. When the record is added, the controller 11 assigns identification information to the established service and stores the identification information into the service ID field. In the locker ID field, identification information about a storage unit of a locker 4 assigned by the controller 11 is stored. In the user ID, storage date and time, storage place, taking out date and time, taking out place and request time terminal information fields, identification information about a user, a storage date and time, a storage place, a taking out date and time, a taking out place and identification information about the user terminal 2 received from the user terminal 2 together with the locker use request are stored, respectively, by the controller 11.

An initial value of the taking out completion notification field is information indicating that a taking out completion notification has not been received. When a taking out completion notification is received from the user terminal 2, the taking out completion notification field is updated by the controller 11 to information indicating that the taking out completion notification has been received. The information held in the service information DB 14 is not limited to the information illustrated in FIG. 5.

Figure 6:
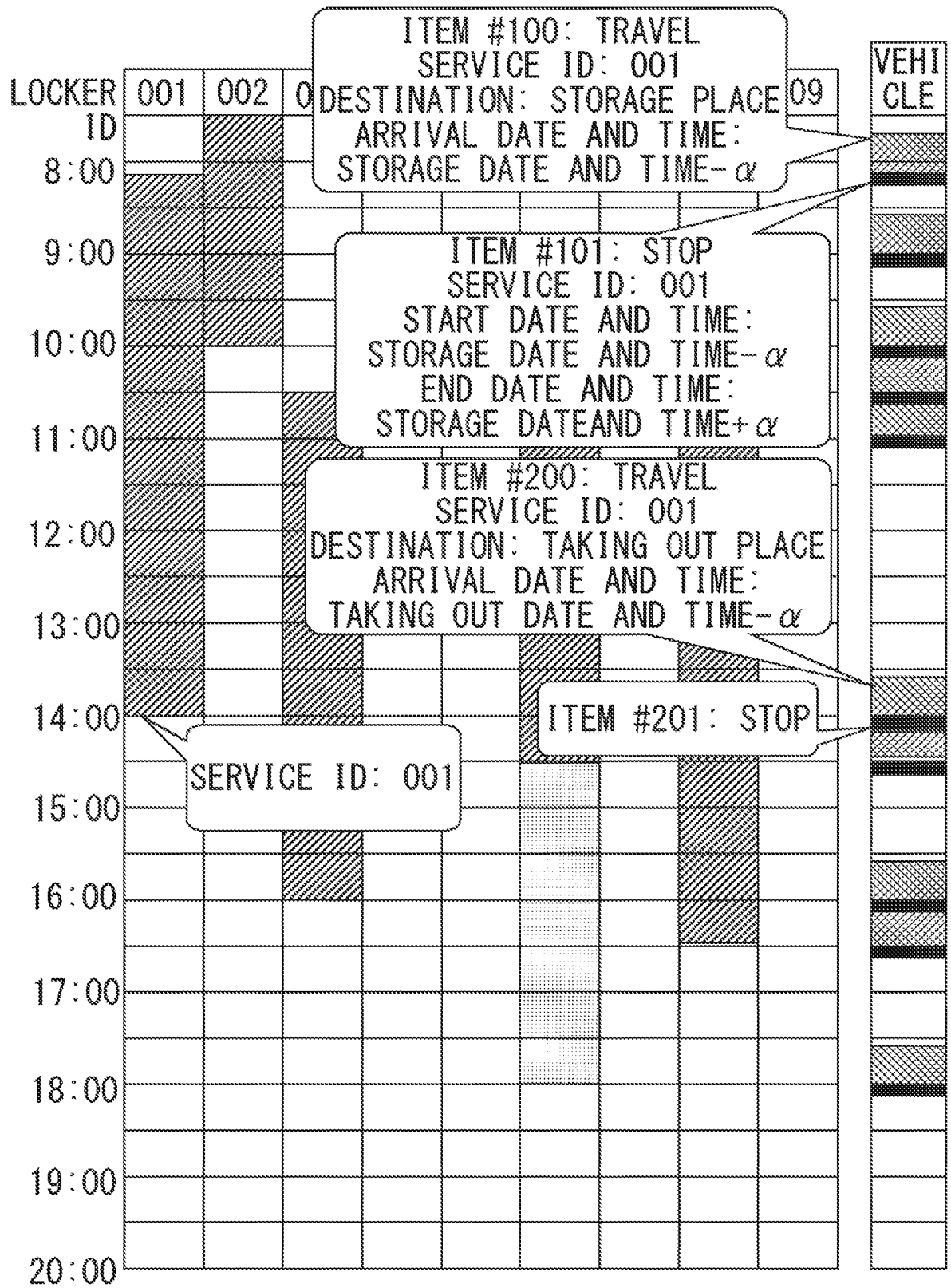
FIG. 6 illustrates an example of information held in a schedule information database.

FIG. 6 illustrates an example of information held in the schedule information DB 13. In the schedule information DB 13, a schedule of each storage unit of a locker 4 and vehicle 3 is stored. In the example illustrated in FIG. 6, schedules of one vehicle 3 and each storage unit of a locker 4 loaded in the vehicle 3 during business hours of a certain day are indicated.

In the example illustrated in FIG. 6, a storage unit with a locker ID: 001 is assigned to a service with a service ID: 001 and is reserved from 8:15 to 14:00. For the service with the service ID: 001, a storage date and time is set to 8:15, and a taking out date and time is set to 14:00. The schedule of the vehicle 3 is set according to reservation of each storage unit. As schedule items of the vehicle 3 corresponding to the service with the service ID: 001 assigned to the storage unit with the locker ID: 001, items #100, #101, #200 and #201 are set.

The items #100 and #101 are schedule items corresponding to baggage storage of the service with the service ID: 001. The item #100 is an item of a travel event of the vehicle 3. For the item #100, a storage place of the service ID: 001 is set as a destination of the travel, and a date and time corresponding to a storage date and time of the service ID: 001−α is set as an arrival date and time. The item #101 is an item of a stop event of the vehicle 3. The stop event of the vehicle 3 of the items #101 is an event for a user to store baggage into the locker 4. A series of motions of the user to store the baggage into the locker 4 includes getting into the vehicle 3, storing the baggage into the storage unit, locking the storage unit and getting off the vehicle 3. It is necessary for the vehicle 3 to stop for enough time to execute the series of motions. Therefore, for the item #101, the date and time corresponding to the storage date and time of the service ID: 001−α is set as a date and time to start the stop, and a date and time corresponding to the storage date and time of the service ID: 001+α is set as a date and time to end the stop.

Therefore, a travel plan set for the vehicle 3 corresponding to the items #100 and #101 is a travel plan indicating that the vehicle 3 travels to the storage place to arrive at the storage date and time−α and stops at the storage place from the storage date and time−α to the storage date and time+U.

The items #200 and #201 are schedule items corresponding to baggage taking out of the service with the service ID: 001. The item #200 is an item of a travel event of the vehicle 3. For the item #200, a taking out place of the service ID: 001 is set as a destination of the travel, and a date and time corresponding to a taking out date and time of the service ID: 001−α is set as arrival date and time. The item #201 is an item of a stop event of the vehicle 3. The stop event of the vehicle 3 of the items #201 is an event for the user to take out the baggage from the locker 4. A series of motions of the user to take out the baggage from the locker 4 includes getting into the vehicle 3, unlocking the storage unit, taking out the baggage from the storage unit and getting off the vehicle 3. Therefore, for the item #201, the date and time corresponding to the taking out date and time of the service ID: 001−α is set as a date and time to start the stop, and a date and time corresponding to the taking out date and time of the service ID: 001+α is set as a date and time to end the stop.

Therefore, a travel plan set for the vehicle 3 corresponding to the items #200 and #201 is a travel plan indicating that the vehicle 3 travels to the taking out place to arrive at the taking out date and time−α and stops at the taking out place from the taking out date and time−α to the taking out date and time+α.

Further, the locker 4 loaded in the vehicle 3 includes a plurality of storage units other than the storage unit with the locker ID: 001, and items of travel/stop events of the vehicle 3 are also generated for the storage units and recorded in the schedule information DB 13. During each period in which the schedule of the vehicle 3 is empty, the controller 11, for example, causes the vehicle 3 to travel on a route adjusted based on the schedule before and after the empty period. The controller 11 performs assignment of a locker 4, decision of a taking out place and a taking out date and time, and the like with reference to the schedule information DB 13. Information held in the schedule information DB 13 is not limited to that illustrated in FIG. 6.

<Screen Example of User Terminal>

FIG. 7 illustrates an example of a screen of each user terminal 2 by the client application for the mobile locker system 100. FIG. 7 illustrates an example of a locker use request screen of the user terminal 2. The locker use request screen is a screen for requesting use of the mobile locker service. The locker use request screen is displayed, for example, by selecting "locker use request" from a menu of the client application for the mobile locker system 100.

The locker use request screen illustrated in FIG. 7 includes storage place, storage date and time, taking out place and taking out date and time input fields, and a button for a locker use request. Each of the storage place and taking out place input fields is provided with radio buttons for selecting a specification method from among "search by keyword", "select from map" and "select from among registered addresses". When "search by keyword" is selected, search results based on an inputted keyword are displayed, and a storage place or a taking out place can be selected from among the search results. As the results of the search by keyword, for example, place names, station names, building names, addresses and the like are displayed.

When "select from map" is selected, the screen transitions to a map display screen, and a storage place or a taking out place can be set on the map. When "select from among registered addresses" is selected, a list of registered addresses is displayed, and a storage place or a taking out place can be selected from the list.

The storage date and time and the taking out date and time may be set, for example, in units of 5 minutes, 10 minutes, 15 minutes or 30 minutes.

When the "start request" button is selected, the controller 21 accepts the user operation for a locker use request and transmits the locker use request to the center server 1. The storage place, the storage date and time, the taking out place and the taking out date and time inputted on the locker use request screen, user identification information and identification information (terminal information) about the user terminal 2 are also transmitted together with the locker use request. The configuration of the locker use request screen is not limited to the example illustrated in FIG. 7.

<Process Flow>

Figure 8:
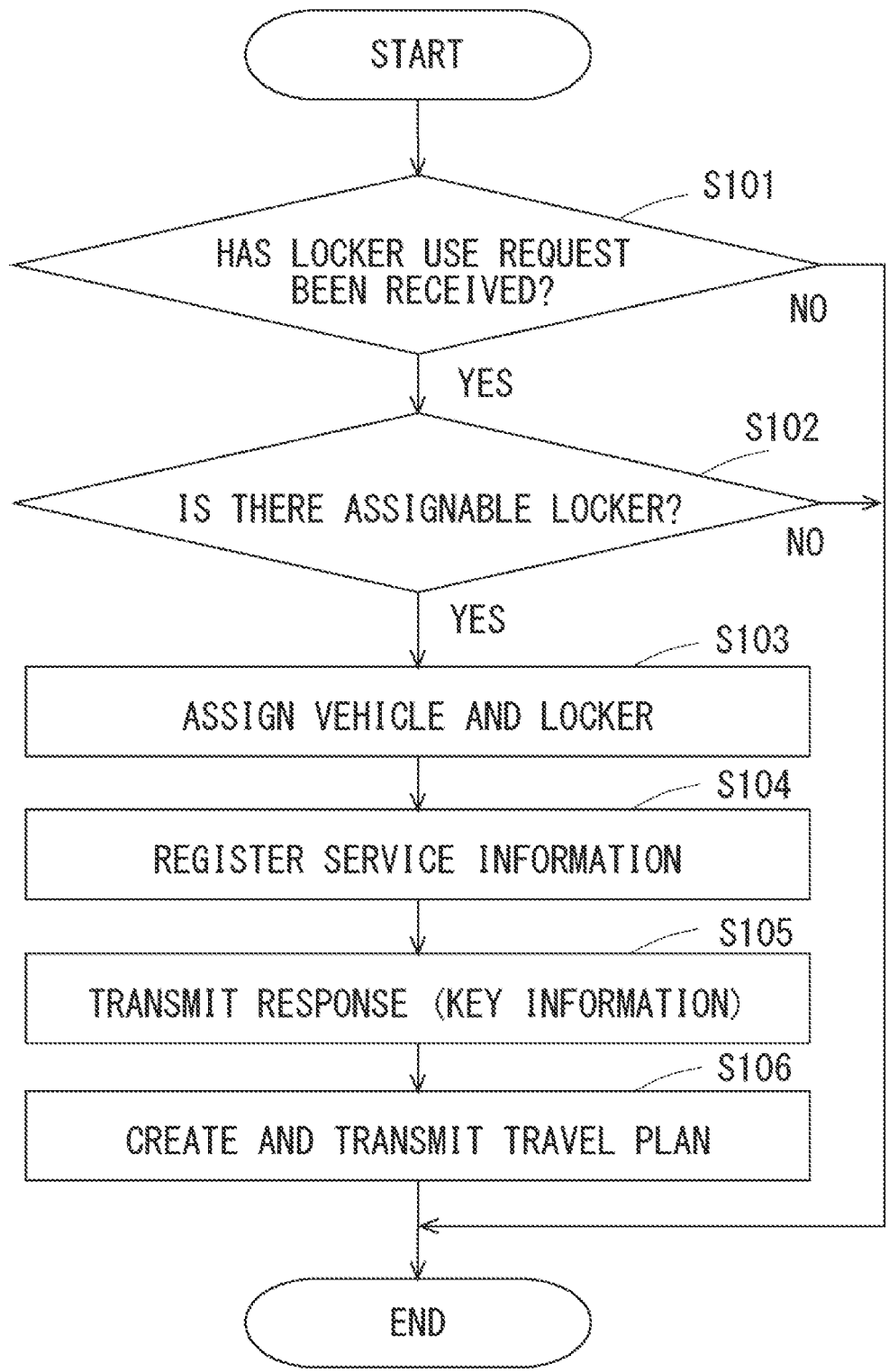
FIG. 8 illustrates an example of a flowchart of a process in a case of the center server receiving a locker use request from the user terminal.

FIG. 8 illustrates an example of a flowchart of a process in a case of the center server 1 receiving a locker use request from a user terminal 2. The process illustrated in FIG. 8 is repeatedly executed in a predetermined cycle. Though the subject of executing the process illustrated in FIG. 8 is the CPU 101 of the center server 1, description will be made with the controller 11, which is a functional component, as the subject for convenience.

At S101, the controller 11 judges whether a locker use request has been received from a user terminal 2 or not. When a positive judgment is made at S101, and a locker use request has been received from a user terminal 2, the process proceeds to S102. On the other hand, when a negative judgment is made at S101, and a locker use request has not been received from a user terminal 2, the process illustrated in FIG. 8 ends.

At S102, the controller 11 refers to the schedule information DB 13 to judge whether a locker 4 that can be assigned to the received locker use request exists or not. For example, the controller 11 judges whether there is a storage unit for which a schedule is not set from the storage date and time to at least the taking out date and time and is loaded in a vehicle 3 that exists or is scheduled to exist at a position from which it is possible to arrive at the storage place at the storage date and time. When a positive judgment is made at S102, and a locker 4 that can be assigned to the received locker use request exists, providing a service for the received locker use request is approved, and the process proceeds to S103. On the other hand, when a negative judgment is made at S102, and a locker 4 that can be assigned to the received locker use request does not exist, the controller 11 transmits a response indicating impossibility to the locker use request, and the process illustrated in FIG. 8 ends.

At S103, the controller 11 decides a storage unit and a vehicle 3 to be assigned to the locker use request from among lockers 4 that can be assigned to the locker use request. As the vehicle 3 assigned to the locker use request, a vehicle 3 which is loaded with a locker 4 provided with a storage unit for which a schedule is not set from the storage date and time to at least the taking out date and time and which exists or is scheduled to exist at a position from which it is possible to arrive at the storage place at the storage date and time is selected. The storage unit assigned to the locker use request is selected from among storage units for which a schedule is not set from the storage date and time to at least the taking out date and time among lockers 4 loaded in the vehicle 3 assigned to the locker use request.

At S104, the controller 11 registers service information corresponding to the received locker use request with the service information DB 14. Further, the controller 11 registers items of a service corresponding to the locker use request with the schedule information DB 13 as parts of schedules of the assigned vehicle 3 and locker 4.

At S105, the controller 11 transmits an approval response to the locker use request, to the user terminal 2. Key information about the assigned storage unit of the locker 4 is also transmitted together with the response of approval of the locker 4. At S106, the controller 11 creates a travel plan corresponding to the schedule registered for the assigned vehicle 3 and transmits the travel plan to the vehicle 3. After that, the process illustrated in FIG. 8 ends.

<Prevention of Illegal Taking Out of Baggage by Third Person>

For baggage stored into a locker 4 by a user, the possibility of a third person illegally taking out the baggage will be described based on FIG. 9. It is assumed that a user X1 transmits the locker use request described above using his own user terminal 2, and provision of a service is approved by the center server 1. The content of the service is temporary storage of baggage X10, and a storage place, a storage date and time, a taking out place and a taking out date and time are indicated by P1, T1, P3 and T3, respectively. Therefore, the user X1 goes to the storage place P1 at the storage date and time T1, and stores the baggage X10 into a locker 4 there. After that, the user X1 is to go to the taking out place P3 at the taking out date and time T3 to take out the baggage X10.

Further, it is assumed that a vehicle 3 loaded with the locker 4 is scheduled to go to a taking out place P2 at a taking out date and time T2 for taking out of baggage X20 by another user X2 between the storage date and time T1 and the taking out date and time T3. Therefore, the vehicle 3 includes a travel plan of moving from the storage place P1 to the taking out place P2, stopping there for a predetermined time, further moving from the taking out place P2 to the taking out place P3 after that, and stopping there for a predetermined time.

Here, for storage of the baggage X10 of the user X1, a case is assumed where a third person Y1 illegally acquires key information related to storage of the baggage X10 due to a communication trouble, a trouble in management of the user terminal 2 or the like. When the third person Y1 can access the locker 4 at a timing before the taking out date and time T3, it becomes possible to unlock the locker 4 using the illegally acquired key information and illegally take out the baggage X10 stored there. That is, when the access to the locker 4 by the third person Y1 is later than the taking out date and time T3, the user X1 accesses the locker 4 earlier, and the illegal taking out can be actually avoided. However, when the access to the locker 4 by the third person Y1 is at a timing before the taking out date and time T3, the third person Y1 precedes the user X1 in access to the locker 4, and there is a possibility that illegal taking out occurs.

Figure 9:
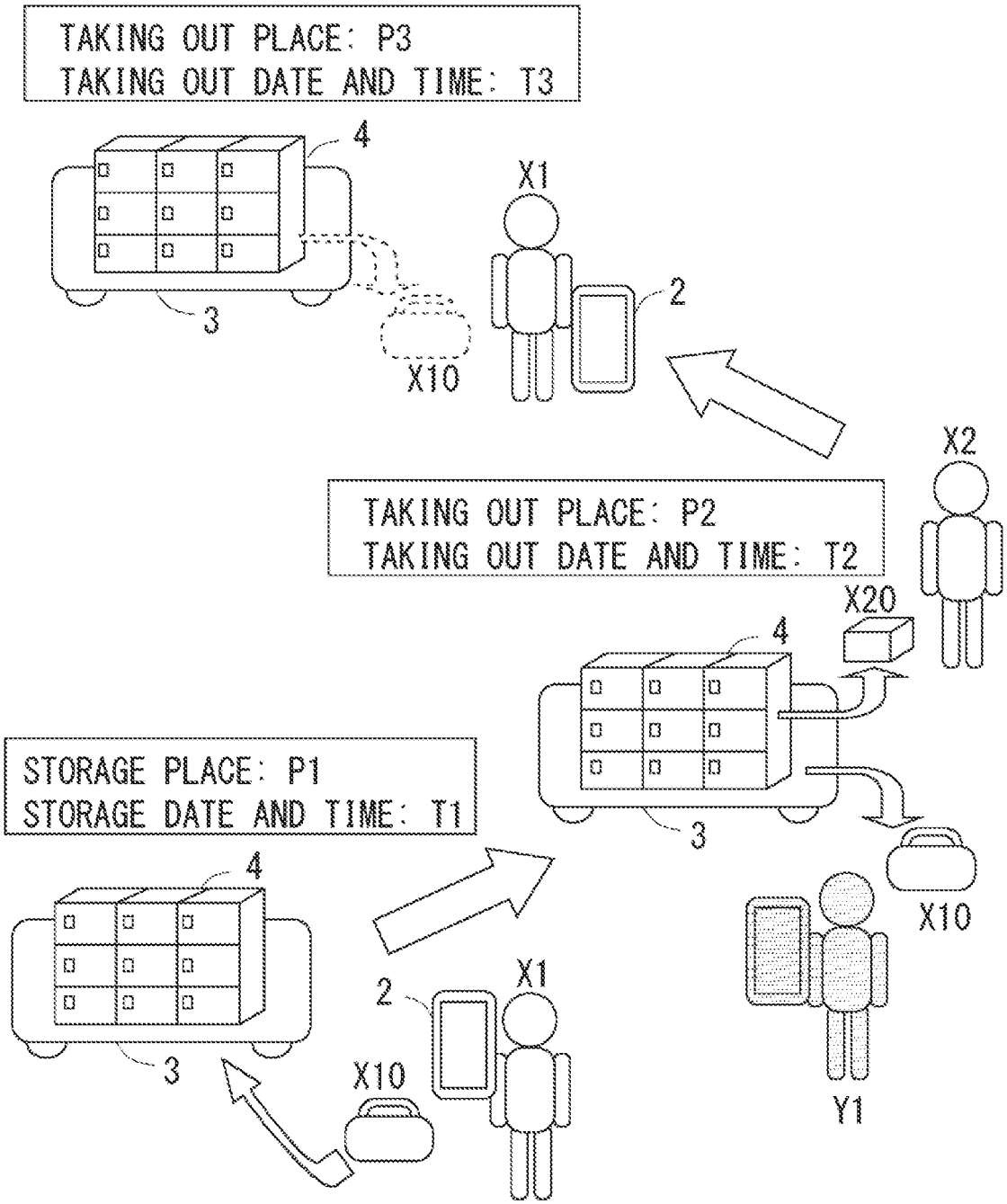
FIG. 9 is a diagram for illustrating illegal taking out of baggage by a third person in the mobile locker system.

For example, as illustrated in FIG. 9, there may be a case where, at the taking out date and time T2, the third person Y1 can approach the vehicle 3 that is stopped for taking out of the baggage X20 by the user X2 and access the locker 4 loaded thereon. At that time, when the third person Y1 uses the illegally acquired key information, he can illegally take out the baggage X10 of the user X1. Such illegal use has to be hindered.

Except for a case where the third person Y1 robs the user X1 of his user terminal 2, the possibility of the user terminal 2 existing near the authorized user X1 is high. Therefore, when the third person Y1 accesses the locker 4 at a timing before the taking out date and time T3 and attempts to unlock the locker 4 using the illegally acquired key information, notification that the locker 4 is about to be unlocked, from the center server 1 to the user terminal 2 is executed. While this notification is being performed, the locked state of the locker 4 is maintained though a collation act using the key information is being performed by the third person Y1.

Figure 10:
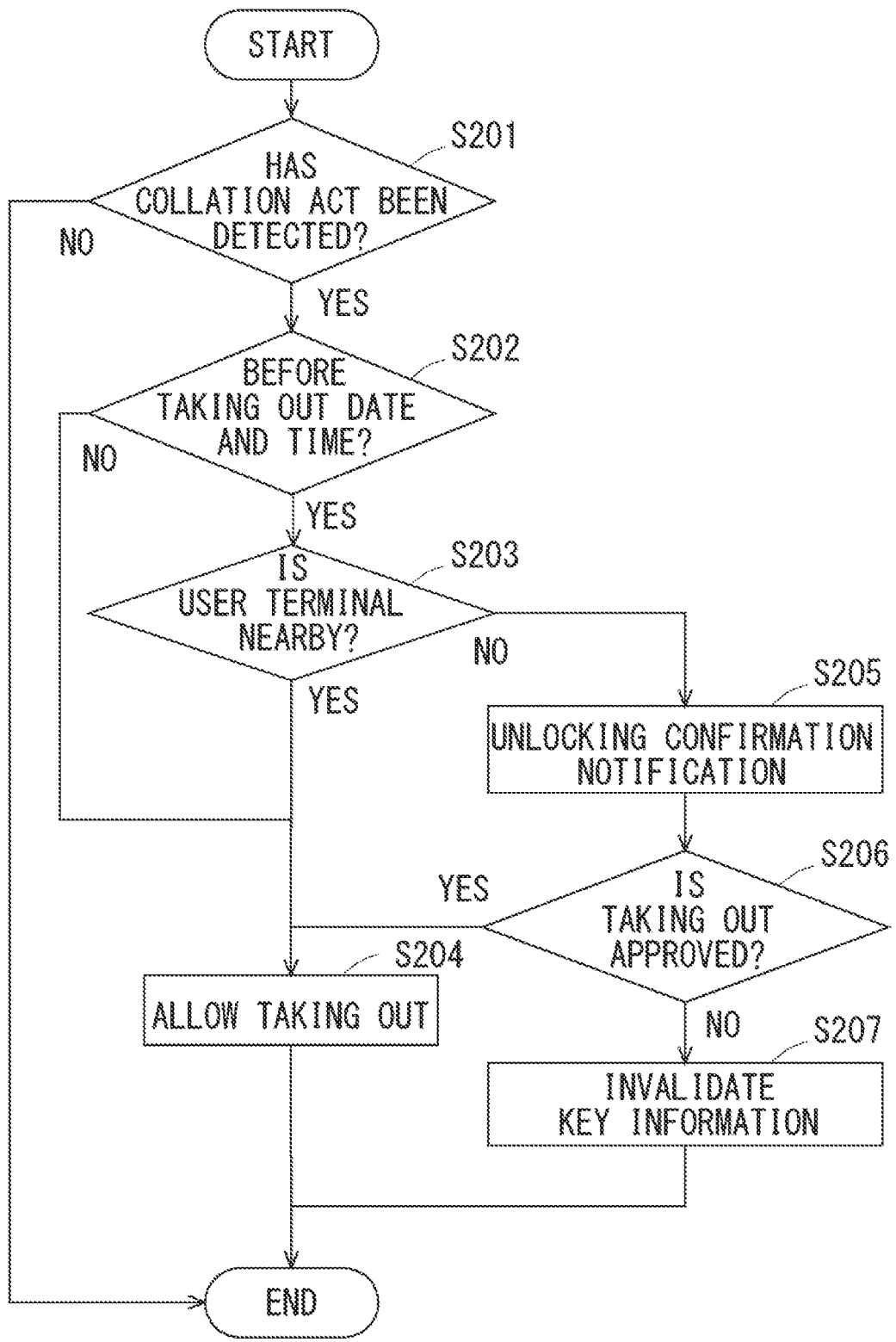
FIG. 10 is a first flowchart about a baggage taking out management process by the center server in a service.

Details of the process about the above notification will be described based on FIG. 10. The process illustrated in FIG. 10 is repeatedly executed in a predetermined cycle. Though the subject of executing the process illustrated in FIG. 10 is the CPU 101 of the center server 1, description will be made with the controller 11, which is a functional component, as the subject for convenience.

At S201, the controller 11 judges whether a collation act using key information for taking out baggage at a locker 4 has been detected or not. Each locker 4 is configured to, when a password, which is the key information, is inputted to take out baggage, communicate that the input has been made to the center server 1. Therefore, the controller 11 performs the judgment process of S201 based on the transmitted information. When a positive judgment is made at S201, the process proceeds to S202. When a negative judgment is made, the process illustrated in FIG. 10 ends.

Next, at S202, the controller 11 judges whether or not the timing of detecting the above collation act using the key information is a timing before a taking out date and time (for example, T3 illustrated in FIG. 9) of the baggage stored in the locker 4 associated with the key information. When a positive judgment is made at S202, the process proceeds to S203. When a negative judgment is made at S202, it means that the timing of the collation act is at or after the taking out date and time as described above. Therefore, in such a case, the possibility of occurrence of illegal taking out of the baggage is extremely low. Therefore, when a negative judgment is made at S202, the process proceeds to S204, where a signal allowing taking out of the baggage is transmitted from the controller 11 to the locker 4. Therefore, the locker 4 that receives the signal is unlocked, and taking out of the baggage is enabled.

Here, at S203, the controller 11 judges whether a user terminal 2 associated with the stored baggage is located near the locker 4 or not. The locker 4 is configured to scan a terminal existing nearby by performing near field communication that is reachable within a predetermined range from the locker 4, and communicates identification information about the existing terminal to the center server 1. Then, the controller 11 of the center server 1 can judge whether or not the user terminal 2 corresponding to the inputted key information is located within a predetermined range from the locker 4, using request time terminal information which is information held in the locker information DB 12 and the service information DB 14. The predetermined range is such a range that it is possible for a user possessing the user terminal 2 to sufficiently confirm taking out of the baggage by a third person when he exists within the range.

As another method, the controller 11 is configured to acquire each of the position of the locker 4 and the position of the user terminal 2, and can execute the judgment process of S203 by comparing both positions. The position of the locker 4 may be transmitted from the vehicle 3 loaded with the locker 4 to the center server 1 using a GPS apparatus provided for the vehicle, and the position of the user terminal 2 may be transmitted from the user terminal 2 to the center server 1 using a GPS apparatus provided for the user terminal 2.

By the judgment of S203 being performed as described above, it is possible to estimate whether the user who stored the baggage is substantially located near the locker 4 or not with a high probability through the position of the user terminal 2. Then, when the user is located near the locker 4, the possibility of the baggage being illegally acquired by a third person is low. Therefore, when a positive judgment is made at S203, the process proceeds to S204, where a signal allowing taking out of the baggage is transmitted from the controller 11 to the locker 4. As the case where a positive judgment is made at S203, a case where the user misremembers a taking out date and time set in advance or a case where the user intentionally or accidentally attempts to take out the baggage at a date and time earlier than scheduled without changing the date and time is assumed. In such a case, by allowing the taking out as described above (the process of S204), it is possible to enhance convenience for the user.

When a negative judgment is made at S203, that is, when a collation act is detected at a timing before the taking out date and time set in advance, and the user (the user terminal 2) is not located near the locker 4, it means that the possibility of illegal taking out of the baggage by a third person is high. In this case, to the user terminal 2 corresponding to the key information used for the collation act, the controller 11 transmits a notification to cause the user to confirm that the locker 4 is about to be unlocked with the key information, and the baggage is about to be taken out. On the user terminal 2 that receives the notification, the content of the notification is displayed on the touch panel display 205.

Further, together with the above notification, the controller 11 may also transmit information about the collation act, for example, the key information inputted for the collation and, when an image of a person performing a collation act is picked up by a camera provided for the locker 4 and picked-up image information is transmitted from the locker 4 to the center server 1, the picked-up image information. By such information being transmitted to the user terminal 2, the user who sees the touch panel display 205 can more accurately grasp the situation that unlocking of the locker 4 is attempted. When the process of S205 ends, the process proceeds to S206.

On the user terminal 2 that receives the above notification, the user is requested to answer whether or not to approve the taking out of the baggage. The user answers that he approves when the taking out of the baggage is intended by himself. On the other hand, when the taking out of the baggage is not intended by the user, he answers that he does not approve. Therefore, at S206, the controller 11 judges whether the answer of approving the taking out of the baggage comes from the user terminal 2 or not. When a positive judgment is made at S206, the process proceeds to S204, and the taking out of the baggage is allowed. As the case where a positive judgment is made at S206, a case where a person on behalf of the user attempts to take out the baggage at a timing before the taking out date and time set in advance, or the like is assumed.

When a negative judgment is made at S206, the taking out of the baggage is, of course, not allowed. Therefore, the key information given to the user terminal 2 before is invalidated for that purpose. At this time, key information of a corresponding storage unit held in the locker information DB 12 is also erased, and new key information is set. Therefore, by the process of S207 being performed, a situation that the baggage temporarily cannot be taken out from the locker 4 is created, and the illegal taking out by the third person is prevented.

As another method of the process of S203, the controller 11 may judge whether or not both of the user terminal 2 and the vehicle 3 loaded with the locker 4 are located within a predetermined range from the taking out place. The predetermined range is a range, with the taking out place where taking out of the baggage by the user is originally scheduled to be performed as a reference, and is a range where the user can sufficiently confirm taking out of the baggage by a third person when both of the vehicle 3 loaded with the locker 4 and the user terminal 2 possessed by the user exist within therein. Therefore, when a positive judgment is made at S203, the user is in a state of being able to confirm behavior of a third person, and, therefore, the process proceeds to S204. On the other hand, when a negative judgment is made at S203, that is, at least one of the vehicle 3 and the user terminal 2 does not exist within the predetermined range, the user is in a state of not being able to confirm the behavior of the third person, and, therefore, the process proceeds to S205.

Next, a process for enabling the user himself to take out the baggage from the locker 4 in a state that the baggage temporarily cannot be taken out therefrom by the above process of S207 will be described based on FIG. 11. The process illustrated in FIG. 11 is repeatedly executed in a predetermined cycle. Though the subject of executing the process illustrated in FIG. 11 is the CPU 101 of the center server 1, description will be made with the controller 11, which is a functional component, as the subject for convenience.

At S301, the controller 11 judges whether or not the current date and time is a timing at or after the taking out date and time of the baggage that has been stored into the locker 4 by the user and is in the state that it cannot be taken out. When a positive judgment is made at S301, the process proceeds to S302. When a negative judgment is made, the process illustrated in FIG. 11 ends.

At S302, the controller 11 judges whether the position of the user terminal 2 possessed by the user and the position of the locker 4 correspond to each other or not. Acquisition of the position of the user terminal 2 and the position of the locker 4 is as described above. That both positions correspond to each other means that the user is located close to the locker 4, that is, both are so close to each other that the user can immediately take out the baggage stored in the locker 4. Therefore, it is thought that, when such a proximity state is formed, it is difficult for the baggage to be illegally taken out by a third person. In consideration thereof, the process proceeds to S303 when a positive judgment is made at S302. When a negative judgment is made, the process illustrated in FIG. 11 ends.

At S303, the controller 11 gives new key information to the user terminal 2. The new key information corresponds to the key information on the locker 4 side updated by the key information invalidation process of S207. Then, at S304, the controller 11 performs a process for collating new key information inputted to the locker 4 side by a collation act of the user and the information in the locker information DB 12. Next, at S305, the controller 11 judges whether or not a result of the collation process is no problem (the result is OK). When a positive judgment is made at S305, the process proceeds to S306, where the locker 4 is unlocked, and taking out of the baggage is allowed. On the other hand, when a negative judgment is made at S305, the process proceeds to S307, and taking out of the baggage is not allowed, with the locker 4 not being unlocked.

According to the process illustrated in FIG. 11, by new key information for unlocking a locker 4 being given to a user terminal 2 on condition that the position of the user terminal 2 and the position of the locker 4 correspond to each other, the user can safely take out his own baggage. Especially, in consideration of the situation that illegal taking out of the baggage by a third person was feared, the configuration that enables safe taking out of baggage as above makes it possible to favorably realize both of security and convenience of the mobile locker system 100.

<Example of Process Sequence>

Figure 12A:
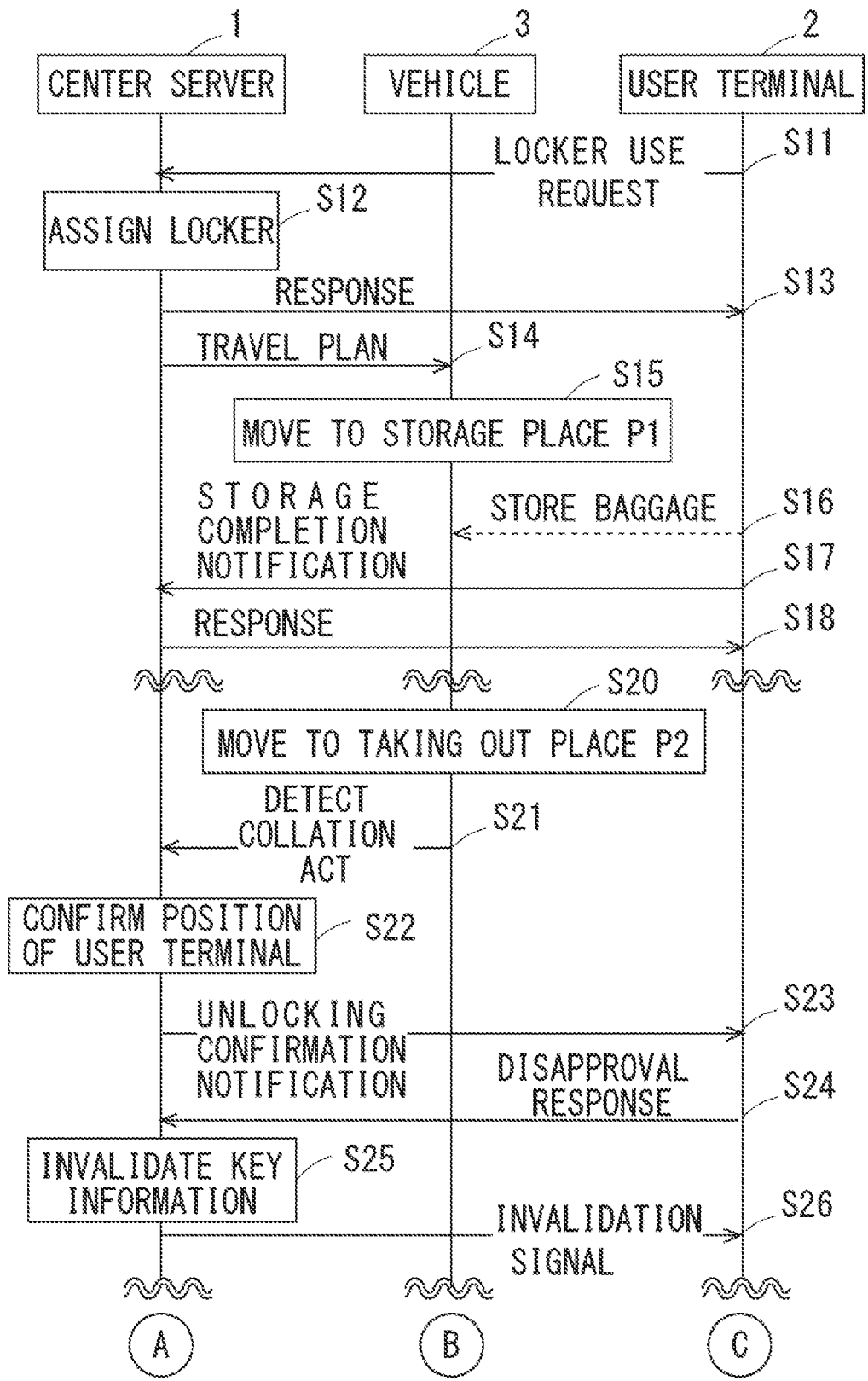
FIG. 12A is a diagram illustrating an example of a sequence of a process in the mobile locker system.

FIGS. 12A and 12B are diagrams illustrating an example of a process sequence in the mobile locker system 100, that is, exchange of signals among the center server 1, the vehicle 3 and the user terminal 2 included in the mobile locker system 100 when the processes illustrated in FIGS. 10 and 11 are executed. This sequence corresponds to the process from when the user X1 stores the baggage X10 until when the user takes out the baggage X10, which is illustrated in FIG. 9. Since the locker 4 is loaded in the vehicle 3, the vehicle 3 and the locker 4 are integrally expressed in FIGS. 12A and 12B for convenience of description.

At S11, the user terminal 2 accepts input of a user operation for the locker use request and transmits the locker use request to the center server 1. After that, at S12, the center server 1 receives the locker use request from the user terminal 2 (corresponding to S101 in FIG. 8) and performs assignment of the vehicle 3, a storage unit of the locker 4 to the locker use request (corresponding to S103 in FIG. 8). Then, in consideration of a result of the above assignment, the center server 1 transmits an approval response to the locker use request, and key information to the user terminal 2 at S13 (S105 in FIG. 8). Furthermore, at S14, the center server 1 transmits a travel plan to the vehicle 3 (S106 in FIG. 8). The travel plan transmitted to the vehicle 3 at S14 includes a travel plan based on information held in the schedule information DB 13, for example, traveling so as to arrive at a storage place at a storage date and time−α, stopping at the storage place until the storage date and time+α, traveling so as to arrive at a taking out place at a taking out date and time−α, stopping at the taking out place until the taking out date and time+α, and the like.

At S15, the vehicle 3 travels so as to arrive at the storage place P1 at the storage date and time T1 according to the travel plan. At S16, the user of the user terminal 2 stores baggage into the locker 4 loaded in the vehicle 3. At S17, the user terminal 2 accepts input of a user operation for storage completion from the user and transmits a storage completion notification to the center server 1. Then, at S18, the center server 1 receives the storage completion notification from the user terminal 2 and transmits a response to the user terminal 2.

Next, at S20, the vehicle 3 travels so as to arrive at the taking out place P2 at the taking out date and time T2 according to the travel plan. The travel corresponds to taking out of the baggage X20 by the different user X2 illustrated in FIG. 9. Then, at or after the vehicle 3 arrives at the taking out place P2, a collation act for the locker 4 is detected at S21. The subject of the collation act is the third person Y1 who has illegally acquired the key information of the user X1. Detection information about the collation act detected on the vehicle 3 side (the locker 4 side) is transmitted to the center server 1 and is also detected on the center server 1 side (corresponding to S201 in FIG. 10). Then, when the timing of executing the collation act is a timing before the taking out date and time T3 set in advance, confirmation of the position of the user terminal 2 is performed at S22. The position confirmation corresponds to S203 in FIG. 10, and it is estimated whether the collation act earlier than scheduled is an illegal act or not thereby.

Then, when it is judged by the position confirmation of the user terminal 2 that the user terminal 2 is not located near the locker 4, an unlocking confirmation notification is made to the user terminal 2 from the center server 1 at S23 (corresponding to S205 in FIG. 10). Then, when the user, who is a possessor of the user terminal 2 that receives the notification, judged that he does not approve, a response to that effect (a disapproval response) is sent to the center server 1 from the user terminal 2 at S24 (corresponding to S206 in FIG. 10). Then, the center server 1 that receives the disapproval response performs the key information invalidation process at S25 and transmits a signal for invalidating the key information already transmitted to the user terminal 2 (corresponding to S207 in FIG. 10). By these processes, it is possible to hinder the baggage X10 of the user X1 from being illegally acquired by the third person Y1.

Next, at S30, the vehicle 3 travels so as to arrive at the taking out place P3 at the taking out date and time T3 according to the travel plan. The travel corresponds to taking out of the baggage X10 by the user X1. At this point of time, however, the baggage X10 is in the state that it cannot be taken due to the key information invalidation process described above. Then, at S31, confirmation of the position of the user terminal 2 is performed. The position confirmation corresponds to S302 in FIG. 11, and, thereby, it is judged whether the user himself is located so close to the locker 4 that he is not influenced by the third person Y1.

Then, when the position of the user terminal 2 and the position of the locker 4 correspond to each other as a result of the position confirmation of the user terminal 2, new key information is given to the user terminal 2 from the center server 1 at S32 (corresponding to S303 in FIG. 11). After that, by collation processing being performed using the new key information, the locker 4 is unlocked. As a result, at S33, the user of the user terminal 2 can take out the baggage from the locker 4 loaded in the vehicle 3. At the subsequent S34, the user terminal 2 accepts input of a user operation of taking out completion from the user and outputs a taking out completion notification to the center server 1. Then, at S35, the center server 1 receives the taking out completion notification from the user terminal 2 and transmits a response to the user terminal 2.

Operation and Effects of First Embodiment

In the first embodiment, when it is judged that the possibility of taking out of baggage by a third person who has illegally acquired key information is high, an unlocking confirmation notification is made to a user terminal while locking of a locker is maintained. Thereby, it is possible to, when the taking out is not intended by the user, unlocking of the locker is hindered. Thus, it is possible to prevent illegal taking out of the baggage, and it is possible to enhance security of the mobile locker system.

Further, by judging the possibility of illegal taking out of the baggage through position confirmation of the user terminal, it is possible to flexibly respond to taking out by the user at a timing before a taking out date and time set in advance, and both of security and convenience of the mobile locker system can be realized.

Further, even when the key information invalidation process is performed as a result of judging that the possibility of illegal taking out of the baggage by a third person is high, it is possible to realize taking out of the baggage by the user himself in a state of ensuring safety of taking out of the baggage, through the position confirmation of the user terminal. Thereby, both of security and convenience of the mobile locker system can be realized.

Second Embodiment

Figure 13:
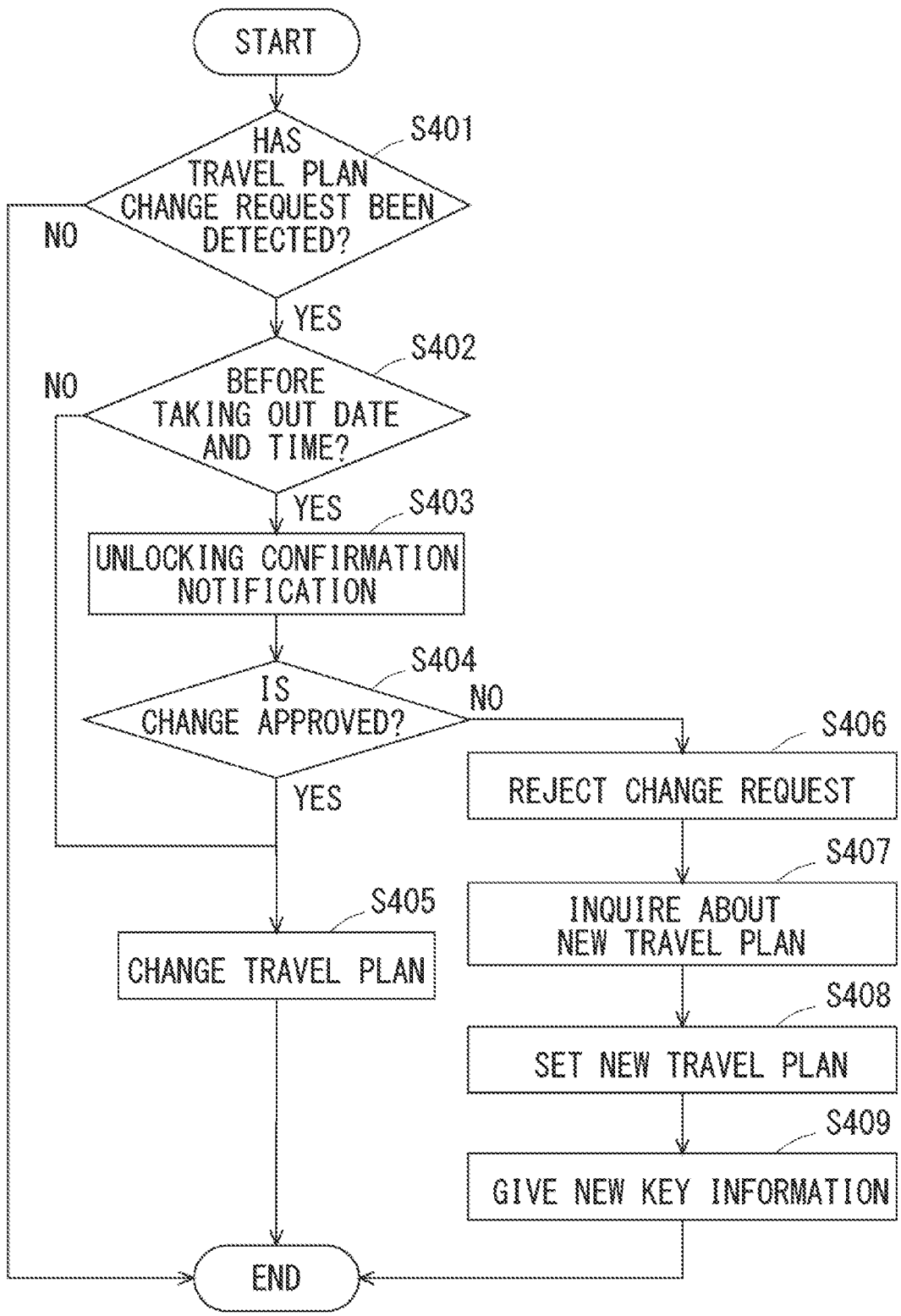
FIG. 13 is a second flowchart about the baggage taking out management process by the center server in the service.

A second embodiment about notification of unlocking confirmation will be described based on FIG. 13. The process illustrated in FIG. 13 is repeatedly executed in a predetermined cycle. Though the subject of executing the process illustrated in FIG. 13 is the CPU 101 of the center server 1, description will be made with the controller 11, which is a functional component, as the subject for convenience.

At S401, the controller 11 judges whether a request to change a travel plan of a vehicle 3 has come from an external apparatus other than a corresponding user terminal 2 or not. The request to change the travel plan is, for example, a request to change a taking out place or a taking out date and time. Since the change is a change of a baggage taking out condition, there is a possibility that an illegal change request leads to illegal taking out of baggage. When it becomes possible for a third person to illegally access information of use of the mobile locker system 100 by the user for some reason, there is a strong possibility that the access is performed from an apparatus other than the user terminal 2. Therefore, the controller 11 detects the change request by access from an external apparatus other than the user terminal 2, using request time terminal information included in a record held in the service information DB 14. When a positive judgment is made at S401, the process proceeds to S402. When a negative judgment is made, the process illustrated in FIG. 13 ends.

Next, at S402, the controller 11 judges whether or not the timing of detecting the above change request is a timing before a taking out date and time of baggage stored in a locker 4 associated with the change request (for example, T3 illustrated in FIG. 9). When a negative judgment is made at S402, it means that the timing of the change request is at or after the taking out date and time. In such a case, the possibility of occurrence of illegal taking out of the baggage is extremely low as described in the first embodiment. Therefore, when a negative judgment is made at S402, the process proceeds to S405, where the travel plan is changed according to the request.

When a positive judgment is made at S402, it means that the request to change the travel plan is made from an external apparatus at a timing before the taking out date and time set in advance, and that the possibility of illegal taking out of the baggage by a third person is high. In this case, the process proceeds to S403, where the controller 11 transmits a notification for causing the user to confirm that the locker 4 is about to be unlocked by change of the travel plan from outside to take out the baggage, to the user terminal 2 associated with the change request. On the user terminal 2 that receives the notification, the content of the notification is displayed on the touch panel display 205.

The controller 11 may also transmit information about the change request, for example, the taking out place or the taking out date and time requested to be changed and information about the external apparatus requesting the change, together with the above notification. By such information being transmitted to the user terminal 2, the user who sees the touch panel display 205 can more accurately grasp the situation that unlocking of the locker 4 is attempted. When the process of S403 ends, the process proceeds to S404.

On the user terminal 2 that receives the above notification, the user is requested to answer whether or not to approve the travel plan change request. The user answers that he approves when the change request is intended by him. On the other hand, when the change request is not intended by the user, he answers that he does not approve. Therefore, at S404, the controller 11 judges whether the answer of approving the change request comes from the user terminal 2 or not.

When a positive judgment is made at S404, the process proceeds to S405, where the travel plan is changed according to the change request. As the case where a positive judgment is made at S404, a case where a person on behalf of the user attempts to change the travel plan at a timing before the taking out date and time set in advance, or the like is assumed.

When a negative judgment is made at S404, the travel plan change request is rejected at S406. Thereby, change of the travel plan change according to the change request issued from the external apparatus is not performed. In consideration that such a request was made, however, the user may worry about keeping the travel plan as it is. Therefore, at S407, the controller 11 inquires of the user terminal 2 about a new travel plan. The inquiry is for inquiring whether or not to change the taking out place, the taking out date and time and the like, and the content of the inquiry is displayed on the touch panel display 205 of the user terminal 2. The user sees the inquiry content and then answers whether or not to require setting of a new travel plan, and the content of the setting via the touch panel display 205. Then, at S408, the controller 11 sets a new travel plan in consideration of the answer from the user terminal 2. The new travel plan is made by the schedule adjustment unit 16. The newly set travel plan is reflected on the schedule information DB 13 and transmitted to the vehicle 3.

Further, the controller 11 gives new key information to the user terminal 2 at S409 so that the user can take out the baggage more safely. When the new key information is given, the key information on the locker 4 side (the information held in the locker information DB 12) is also updated according to the information.

Operation and Effects of Second Embodiment

In the second embodiment, when it is judged that the possibility of taking out of baggage by a third person through an illegal change of a travel plan is high, an unlocking confirmation notification is made to a user terminal while locking of a locker is maintained. Thereby, when the change of the travel plan is not intended by the user, it is possible to prevent illegal taking out of the baggage, and it is possible to enhance security of the mobile locker system.

Other Embodiments

The embodiments described above are mere examples, and the present disclosure can be appropriately changed and practiced within a range not departing from the spirit of the disclosure. The processes and means described in the present disclosure can be freely combined and implemented as far as a technical problem does not occur.

For example, when a locker 4 is configured to be locked/unlocked with a physical key, an event related to illegal taking out of baggage by a third person can be assumed to be an act of inserting the physical key into a key hole at a timing before a taking out date and time. In such a form, when insertion of the physical key into the key hole is detected, the unlocking confirmation notification described above is made. The locker 4 is configured such that, until a user's answer to the notification returns to the center server 1, the physical key inserted in the key hole cannot perform an action (rotation or the like) for unlocking. When the answer to the notification indicates approval of unlocking, the action of the physical key for unlocking is allowed. When the answer to the notification indicates disapproval of unlocking, the action of the physical key for unlocking is not allowed.

Further, a process described as being performed by one apparatus may be shared and executed by a plurality of apparatuses. Or alternatively, processes described as being performed by different apparatuses may be executed by one apparatus. In a computer system, by what hardware configuration (server configuration) each function is realized can be flexibly changed. For example, though the processes illustrated in FIGS. 10, 11 and 13 have been described as processes executed by the center server 1, a part of the processes may be executed by a computer included in a locker 4 or a computer included in a vehicle 3 loaded with the locker 4 so that the computer and the center server 1 may perform processes that are substantially the same as the processes illustrated in FIGS. 10, 11 and 13 in cooperation with each other. In such a case, the computer and the center server 1 are configured to correspond to "an information processing apparatus" of the present disclosure.

The present disclosure can be realized by supplying a computer program implemented with the functions described in the above embodiments to a computer, and one or more processors that the computer includes reading out and executing the program. Such a computer program may be provided for the computer by a non-transitory computer-readable storage medium that can be connected to the system bus of the computer or may be provided for the computer via a network. As the non-transitory computer-readable storage medium, for example, any type of disk such as a magnetic disk (a floppy (registered trademark) disk, a hard disk drive (HDD) or the like) and an optical disk (a CD-ROM, a DVD disk, a Blu-ray Disc or the like), a read-only memory (ROM), a random access memory (RAM), an EPROM, an EEPROM, a magnetic card, a flash memory, an optical card, and any type of medium suitable for storing electronic instructions are included.

What is claimed is:

1. An information processing apparatus comprising a controller including at least one processor configured to:
give key information for unlocking a locker loaded in a vehicle to a user terminal at a time of storage of baggage in the locker by a user; and
for baggage stored in the locker, make a notification that confirms user intent of unlocking of the locker to the user terminal, while a locked state of the locker is maintained, when a predetermined event related to unlocking of the locker is detected before a first date and time set in advance; and wherein
the predetermined event is a collation act using predetermined information corresponding to the key information for unlocking the locker.

2. The information processing apparatus according to claim 1, wherein the controller makes the notification to the user terminal, when the predetermined event is detected and the user terminal is not located within a predetermined range where the locker is included.

3. The information processing apparatus according to claim 1, wherein the controller makes the notification to the user terminal, when the predetermined event is detected and a position of the user terminal does not correspond to a position of the locker.

4. The information processing apparatus according to claim 1, wherein the controller makes the notification to the user terminal, when the predetermined event is detected and at least one of the user terminal and the vehicle is not located within a predetermined range that includes a first position for taking out the baggage that is set in advance.

5. The information processing apparatus according to claim 1, wherein the notification further includes information about the predetermined event.

6. The information processing apparatus according to claim 1, wherein the controller allows taking out the baggage from the locker when receiving an answer to approve to take out the baggage, from the user terminal that has received the notification.

7. The information processing apparatus according to claim 1, wherein the controller transmits an instruction to disable unlocking of the locker by the key information, to the locker when receiving an answer not to approve to take out the baggage from the user terminal that has received the notification.

8. The information processing apparatus according to claim 7, wherein the controller gives new key information for unlocking the locker to the user terminal when detecting a state that a position of the user terminal corresponds to a position of the locker after invalidating the key information.

9. An information processing apparatus according to claim 1, comprising a controller including at least one processor configured to:
for baggage stored in a locker loaded in a vehicle, make a notification that confirms user intent of unlocking of the locker to a user terminal associated with the baggage, while a locked state of the locker is maintained, when a predetermined event related to unlocking of the locker is detected before a first date and time set in advance; and
wherein the predetermined event is a request to change a travel plan of the vehicle until the baggage is taken out, the request being made by an external apparatus other than the user terminal.

10. The information processing apparatus according to claim 9, wherein the controller rejects the change request from the external apparatus and inquires of the user terminal about a new travel plan when receiving an answer not to approve to take out the baggage from the user terminal that has received the notification.

* * * * *